US011218675B2

(12) United States Patent
Asai et al.

(10) Patent No.: US 11,218,675 B2
(45) Date of Patent: Jan. 4, 2022

(54) INFORMATION PROCESSING APPARATUS, COMPUTATION METHOD OF INFORMATION PROCESSING APPARATUS, AND PROGRAM

(71) Applicant: SONY CORPORATION, Tokyo (JP)

(72) Inventors: Haruka Asai, Kanagawa (JP); Noriaki Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/975,917

(22) PCT Filed: Jan. 16, 2019

(86) PCT No.: PCT/JP2019/001065
§ 371 (c)(1),
(2) Date: Aug. 26, 2020

(87) PCT Pub. No.: WO2019/167455
PCT Pub. Date: Sep. 6, 2019

(65) Prior Publication Data
US 2020/0413015 A1 Dec. 31, 2020

(30) Foreign Application Priority Data

Mar. 2, 2018 (JP) .............................. JP2018-037328

(51) Int. Cl.
*H04N 9/31* (2006.01)
*G06T 5/00* (2006.01)

(52) U.S. Cl.
CPC ........... *H04N 9/3185* (2013.01); *G06T 5/003* (2013.01); *H04N 9/3147* (2013.01); *H04N 9/3188* (2013.01); *H04N 9/3191* (2013.01)

(58) Field of Classification Search
CPC .................. G06T 5/003; G06T 7/0002; G06T 2207/30168; G09G 5/377; G09G 5/00;
(Continued)

(56) References Cited
U.S. PATENT DOCUMENTS 5,905,567 A * 5/1999 Dewan ................. G01B 11/024
356/3.06
2001/0019325 A1 * 9/2001 Takekawa ............. G06F 3/0423
345/157
(Continued)

FOREIGN PATENT DOCUMENTS

JP 2005-269528 A 9/2005
JP 2005-352171 A 12/2005
(Continued)

*Primary Examiner* — Paulos M Natnael
(74) *Attorney, Agent, or Firm* — Paratus Law Group, PLLC

(57) ABSTRACT

Provided is a computation method for obtaining information suitable for positional deviation correction and lens blur correction for a case where a part of or an entire projection image projected by each of a plurality of projectors is displayed in a superimposed manner. For this purpose, a light intensity distribution indicating a degree of lens blur of a base projector and peak coordinates of the light intensity distribution are calculated using a captured image obtained by capturing a test pattern projected by the base projector in an arrangement state in which a plurality of projectors is arranged such that a part of or an entire projection image projected by each of the plurality of projectors is displayed in a superimposed manner. Further, a light intensity distribution centered on the peak coordinates on the base projector side and corresponding to a degree of lens blur of a referencing projector is calculated using a captured image obtained by capturing the test pattern projected by the referencing projector in the same arrangement state. As a result, information indicating the degree of lens blur of the base projector and information corresponding to positional deviation and the degree of lens blur of the referencing projector are obtained.

15 Claims, 15 Drawing Sheets

(58) Field of Classification Search
CPC ...... G09G 5/36; H04N 9/3147; H04N 9/3191; H04N 9/3185; H04N 9/3188; H04N 9/3194; G03B 21/14
See application file for complete search history.

(56) References Cited

U.S. PATENT DOCUMENTS

| | | | | |
|---|---|---|---|---|
| 2008/0117788 A1* | 5/2008 | Kasazumi | ............. | G11B 7/126 |
| | | | | 369/103 |
| 2009/0311636 A1* | 12/2009 | Minoda | ............... | G03F 7/70091 |
| | | | | 430/325 |
| 2010/0310126 A1* | 12/2010 | Johannesson | ........... | G01S 17/48 |
| | | | | 382/103 |
| 2017/0068158 A1* | 3/2017 | Terasawa | ........... | G01N 21/8851 |

FOREIGN PATENT DOCUMENTS

| | | | | |
|---|---|---|---|---|
| JP | 2009-042838 A | | 2/2009 | |
| JP | 2009-524849 A | | 7/2009 | |
| JP | 2011-186110 | * | 3/2010 | ............. G09G 3/36 |
| JP | 2010-081488 A | | 4/2010 | |
| JP | 2011-029727 A | | 2/2011 | |
| JP | 2011-186110 A | | 9/2011 | |
| WO | WO 2016/157671 A1 | | 10/2016 | |

* cited by examiner

FIG.1
A
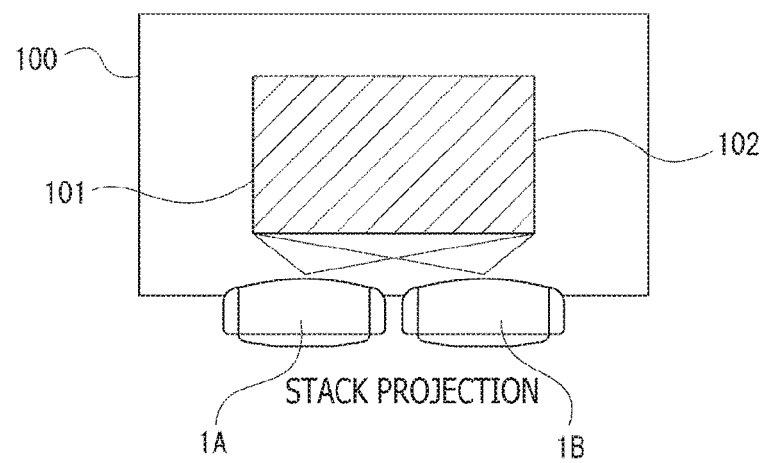
B
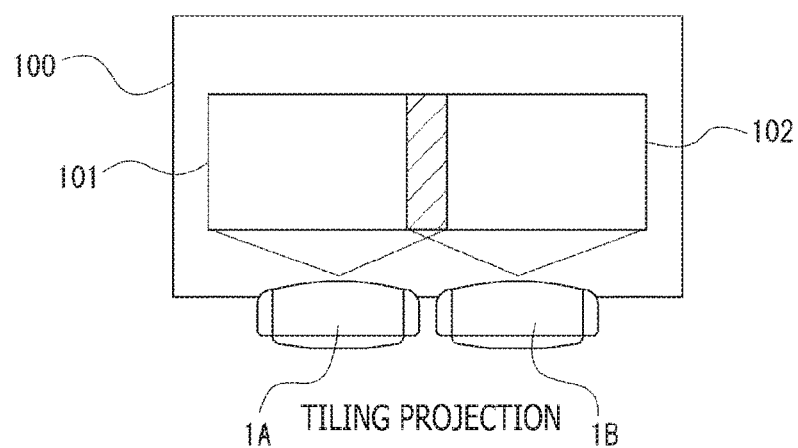

FIG.7
A
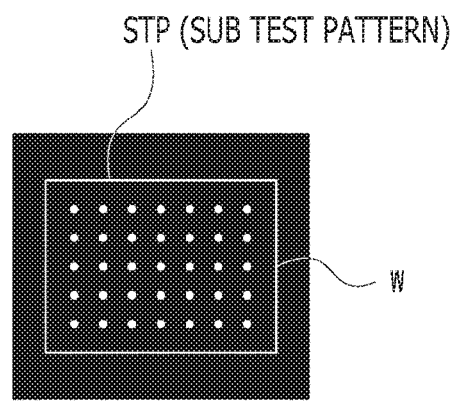
B
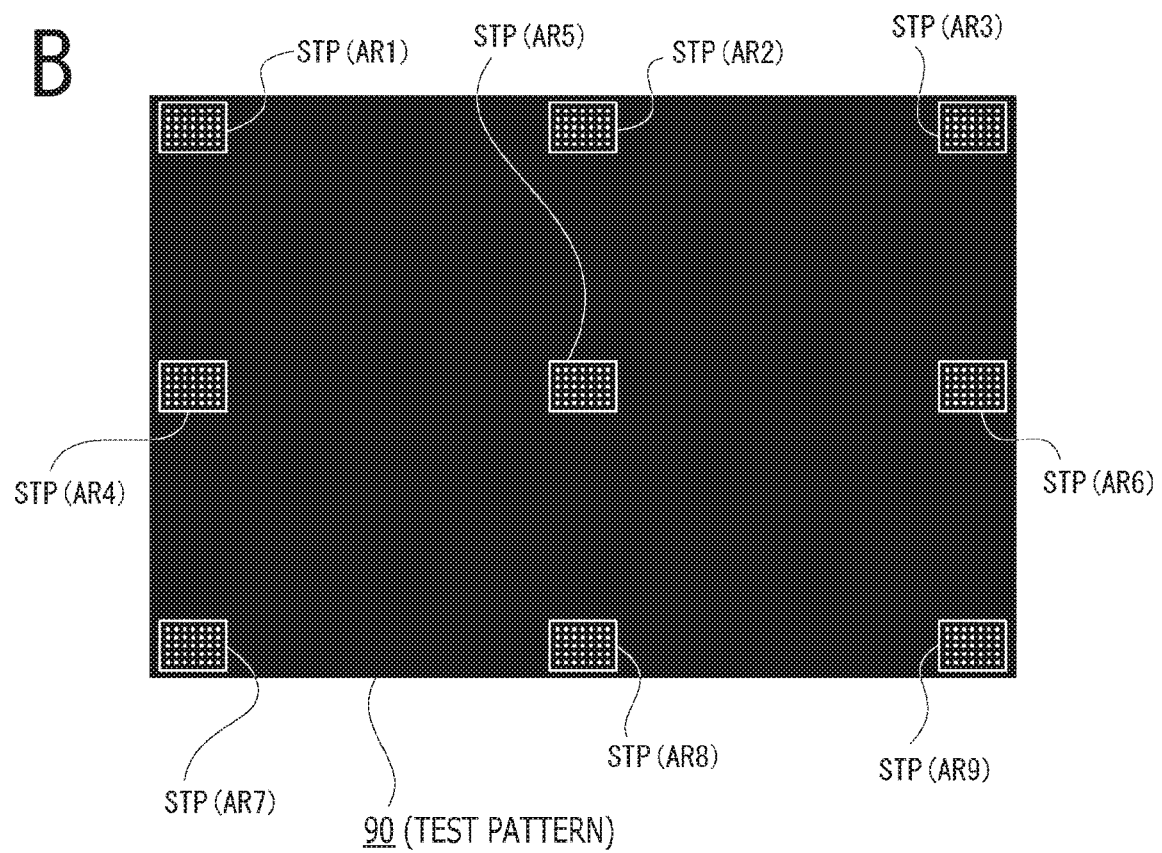

FIG. 9
A SUB TEST PATTERN
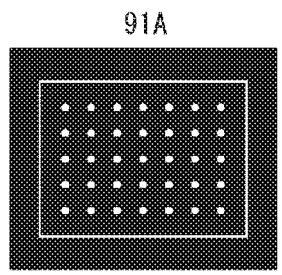
91A
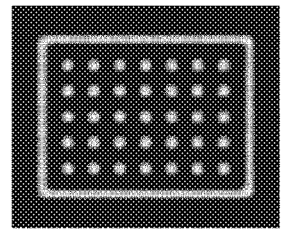
91B
B CAMERA SCALE PSF
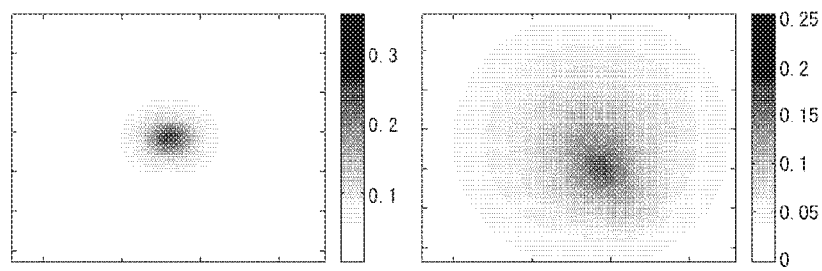
C PROJECTOR SCALE PSF
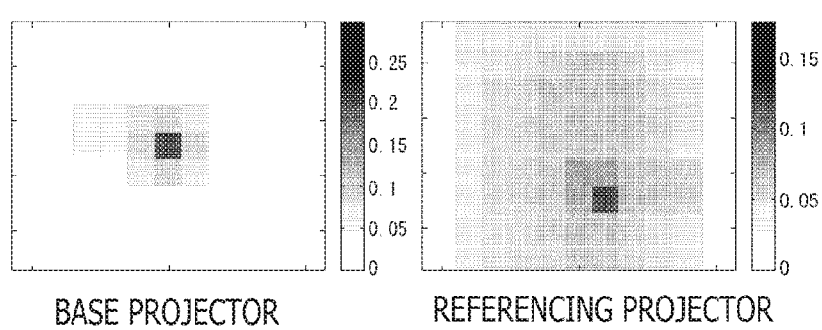
BASE PROJECTOR     REFERENCING PROJECTOR FIG.14
A 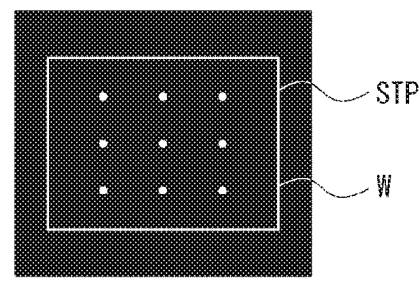
B 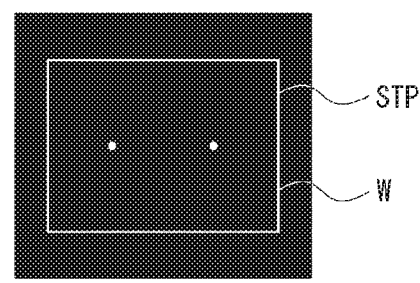
C 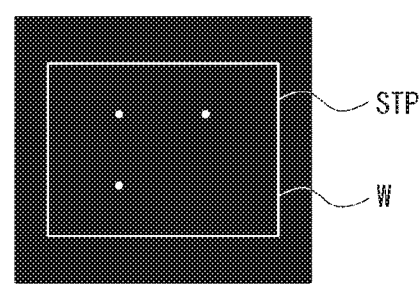
D 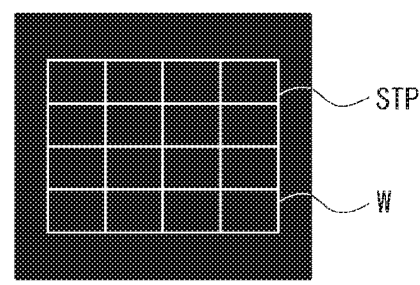

FIG.15
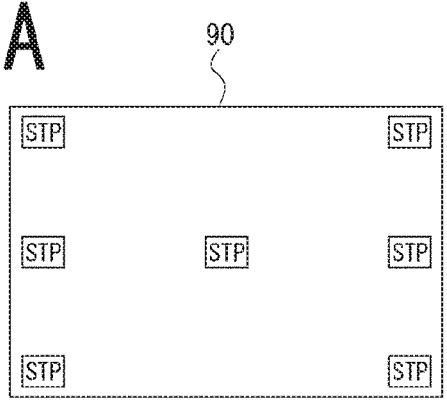
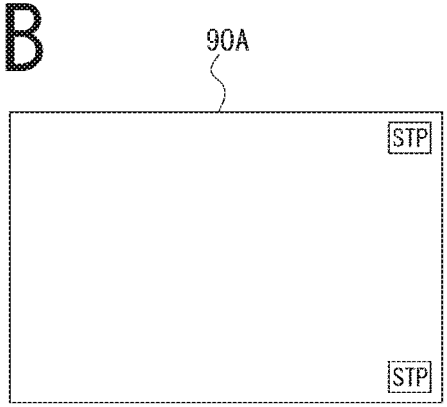
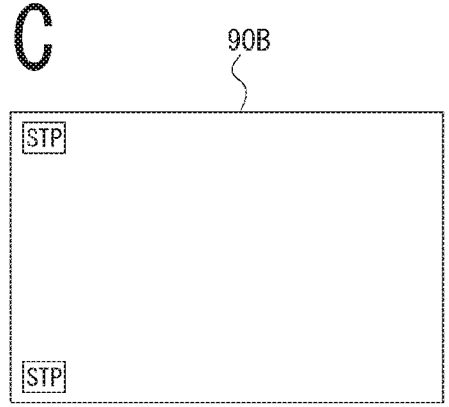
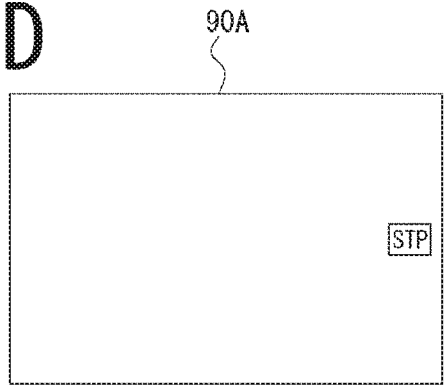
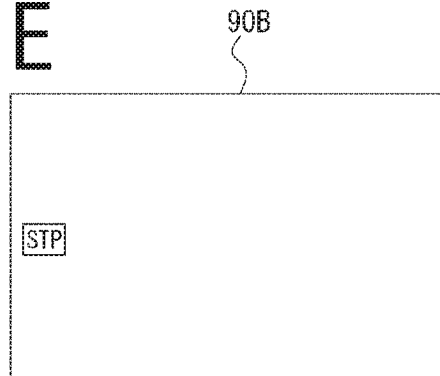

INFORMATION PROCESSING APPARATUS, COMPUTATION METHOD OF INFORMATION PROCESSING APPARATUS, AND PROGRAM

CROSS REFERENCE TO PRIOR APPLICATION

This application is a National Stage Patent Application of PCT International Patent Application No. PCT/JP2019/001065 (filed on Jan. 16, 2019) under 35 U.S.C. § 371, which claims priority to Japanese Patent Application No. 2018-037328 (filed on Mar. 2, 2018), which are all hereby incorporated by reference in their entirety.

TECHNICAL FIELD

The present technology relates to an information processing apparatus, a computation method of the information processing apparatus, and a program, and particularly, to a computation method for performing an appropriate correction in a case where a part of or an entire projection image projected by each of a plurality of projectors is displayed in a superimposed manner.

BACKGROUND ART

There is a projection system in which a plurality of projectors is arranged side by side and a part of or an entire projection image projected by each projector is displayed in a superimposed manner. In this case, the alignment of superimposition display portions needs to be performed with high precision.

PTL 1 described below discloses a technique for correcting a resolution reduction caused by superimposition deviation when a plurality of projectors performs projection in a superimposed manner. Specifically, according to the description in PTL 1, the correction is performed by preparing an MTF (Modulation Transfer Function) deterioration table in advance according to the amount of pixel deviation of each of the second and subsequent projectors, calculating a filter coefficient corresponding to the table, and applying the filter coefficient.

CITATION LIST

Patent Literature

[PTL 1]
Japanese Patent Laid-Open No. 2010-81488

SUMMARY

Technical Problem

Incidentally, the correction necessary for the projection images projected by the projectors requires not only the correction of the positional deviation among the projectors, but also the correction of the lens blur of each projection image. The technique according to PTL 1 described above focuses on the superimposition deviation among the plurality of projectors and does not describe the MTF deterioration caused by the optical blur of a lens of each projector.

Here, if the individual projectors are different from each other, it is not possible to correctly acquire the amount of positional deviation from the MTF deterioration table. In this case, it is expected that the MTF deterioration table needs to be prepared for each projector in order to address the lens blur, and it is hard to say that this is a realistic method. That is, a more precise correction that can also address the lens blur is not disclosed.

Therefore, it is an object of the present technology to easily obtain information suitable for correcting the positional deviation among a plurality of projectors and the lens blur of each projector in a case where a part of or an entire projection image of each of the plurality of projectors is displayed in a superimposed manner.

Solution to Problem

An information processing apparatus according to the present technology includes a first computation section configured to calculate a light intensity distribution indicating a degree of lens blur of a base projector and peak coordinates of the light intensity distribution using a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors, and a second computation section configured to calculate a light intensity distribution centered on the peak coordinates and corresponding to a degree of lens blur of a referencing projector using a captured image obtained by capturing the test pattern projected by the referencing projector, the referencing projector being included in the plurality of projectors other than the base projector, in the arrangement state.

Assume a case where an entire or a part of a projection image projected by each of the plurality of projectors is displayed in a superimposed manner. Information for image correction for this case is acquired. In this case, for example, a light intensity distribution corresponding to a degree of lens blur and its peak coordinates are obtained for the base projector from a captured image of a test pattern. For the referencing projector, an intensity distribution centered on the peak coordinates of the base projector and corresponding to a degree of lens blur is obtained. They can be used for inverse filter calculation for image correction.

In the above-described information processing apparatus according to the present technology, it is conceivable that, from the captured image of the test pattern, the first computation section obtains, using a specific image in the test pattern, the light intensity distribution corresponding to the degree of lens blur of the base projector in a unit of a pixel of the projection image and the peak coordinates of the light intensity distribution.

That is, using the specific image (e.g., an image including a dot image) in the test pattern, the peak coordinates as the pixel position are obtained in a unit of a pixel of the projection image of the projector.

In the above-described information processing apparatus according to the present technology, it is conceivable that the specific image is set at each of a plurality of locations in the projection image.

For example, it is assumed that the test pattern includes the specific image that can be observed at each of a plurality of locations in a superimposition display region of the projection image. The information processing apparatus obtains a light intensity distribution (PSF: Point Spread Function) corresponding to a degree of lens blur and its peak coordinates for each specific image.

In the above-described information processing apparatus according to the present technology, it is conceivable that the specific image includes an image including a one-pixel dot image.

For example, the test pattern is assumed to include a one-pixel dot image. To obtain the PSF, the dot image is selected as the specific image from the captured image.

In the above-described information processing apparatus according to the present technology, it is conceivable that the specific image is set at least at a center and each of four corners of a superimposition region in the projection image.

For example, in a case where a part of or an entire projection image of each of the plurality of projectors is displayed in a superimposed manner, the specific image in the test pattern can be observed at each of a plurality of locations such as at the center and four corners of the superimposition region in the projection image.

In the above-described information processing apparatus according to the present technology, it is conceivable that the specific image is set only at a center or only at each of upper and lower corners of a superimposition region in the projection image.

For example, in a case where only a part of the projection image of each of the plurality of projectors is displayed in a superimposed manner as tiling projection and the superimposition display region is a longitudinally long region, the specific image in the test pattern can be observed at the center, each of the upper and lower corners, or the like of the superimposition region in the projection image.

In the above-described information processing apparatus according to the present technology, it is conceivable that, from the captured image of the test pattern, the second computation section calculates, for the specific image in the test pattern, the light intensity distribution centered on the peak coordinates and corresponding to the degree of lens blur of the referencing projector.

As with the base projector, the intensity distribution for the same specific image (e.g., a dot image in an image including the dot image) in the test pattern is also obtained in a unit of a pixel of the projection image for the referencing projector side with the peak coordinates on the base projector side as the center.

In the above-described information processing apparatus according to the present technology, it is conceivable that the second computation section performs calculation processing by acquiring the captured image of the test pattern that has been geometrically corrected on the basis of alignment of projection positions performed in advance among the plurality of projectors and that has been projected by each projector and captured by an imaging apparatus.

The plurality of projectors performs alignment among the projectors in advance. Each projector projects a corresponding test pattern geometrically corrected according to the result of alignment among the projectors. Then, the calculation processing is performed using a captured image obtained by capturing the test pattern sequentially projected by each projector. As the calculation processing described herein, the first computation section performs processing of calculating a light intensity distribution indicating a degree of lens blur of the base projector and its peak coordinates from the captured image obtained by capturing the test pattern projected by the base projector. Further, the second computation section performs processing of calculating a light intensity distribution centered on the peak coordinates and corresponding to a degree of lens blur of the referencing projector from the captured image obtained by capturing the test pattern projected by the referencing projector.

In the above-described information processing apparatus according to the present technology, it is conceivable to further include an inverse filter computation section configured to generate inverse filters using information regarding the light intensity distribution indicating the degree of lens blur and the peak coordinates of the light intensity distribution calculated by the first computation section and information regarding the light intensity distribution corresponding to the degree of lens blur calculated by the second computation section, the inverse filters being applied to image signal processing of the respective projectors.

The information processing apparatus calculates filter coefficients of the inverse filters used for the image signal processing in the respective projectors to correct the lens blur and the positional deviation.

In the above-described information processing apparatus according to the present technology, it is conceivable that the inverse filter computation section generates an inverse filter to be used in the base projector using the information regarding the light intensity distribution indicating the degree of lens blur calculated by the first computation section.

Since the base projector serves as a positional base, the base projector is only required to correct the lens blur. Therefore, the inverse filter is generated by using the information regarding the light intensity distribution indicating the degree of lens blur calculated by the first computation section.

In the above-described information processing apparatus according to the present technology, it is conceivable that the inverse filter computation section generates an inverse filter to be used in the referencing projector using the information regarding the peak coordinates calculated by the first computation section and the light intensity distribution indicating the degree of lens blur calculated by the second computation section.

The referencing projector is only required to perform lens blur correction as well as positional correction based on the base projector. Therefore, the inverse filter is generated using the information regarding the peak coordinates calculated by the first computation section and the light intensity distribution indicating the degree of lens blur calculated by the second computation section.

In the above-described information processing apparatus according to the present technology, it is conceivable to further include an output section configured to output, to external equipment, information regarding the light intensity distribution indicating the degree of lens blur and the peak coordinates of the light intensity distribution calculated by the first computation section and information regarding the light intensity distribution corresponding to the degree of lens blur calculated by the second computation section.

In a case where another apparatus generates inverse filters used for image signal processing in the respective projectors to correct lens blur and positional deviation, the output section can provide information used for the generation of the inverse filters.

An information processing method according to the present technology includes a first computation step of calculating a light intensity distribution indicating a degree of lens blur of a base projector and peak coordinates of the light intensity distribution using a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors, and a second computation step of calculating a light intensity distribution centered on the peak coordinates and corresponding to a degree of lens blur of a referencing projector using a captured image obtained by capturing the test pattern projected by the referencing projector, the referencing projector being included in the plurality of projectors other than the base projector, in the arrangement state.

A program according to the present technology is a program that causes an information processing apparatus to perform processing corresponding to the first and second computation steps described above.

With this configuration, it is possible to easily obtain information suitable for correcting the positional deviation among the projectors and the lens blur of each projector.

Advantageous Effects of Invention

According to the present technology, it is possible to easily and accurately obtain information that can be used for correcting the lens blur of a base projector and information that can be used for correcting the lens blur and positional deviation of a referencing projector. The present technology can, therefore, contribute to an appropriate correction operation.

It is noted that the effects described herein are not necessarily limited, and any of the effects described in the present disclosure may be provided.

BRIEF DESCRIPTION OF DRAWINGS

FIG. 1 illustrates diagrams for describing stack projection and tiling projection according to an embodiment of the present technology.

FIG. 7 illustrates diagrams for describing a test pattern according to the embodiment.

FIG. 9 illustrates diagrams for describing captured images of test patterns according to the embodiment.

FIG. 14 illustrates diagrams for describing various examples of a sub test pattern according to the embodiment.

FIG. 15 illustrates diagrams for describing various examples of test patterns according to the embodiment.

DESCRIPTION OF EMBODIMENT

Figure 2:
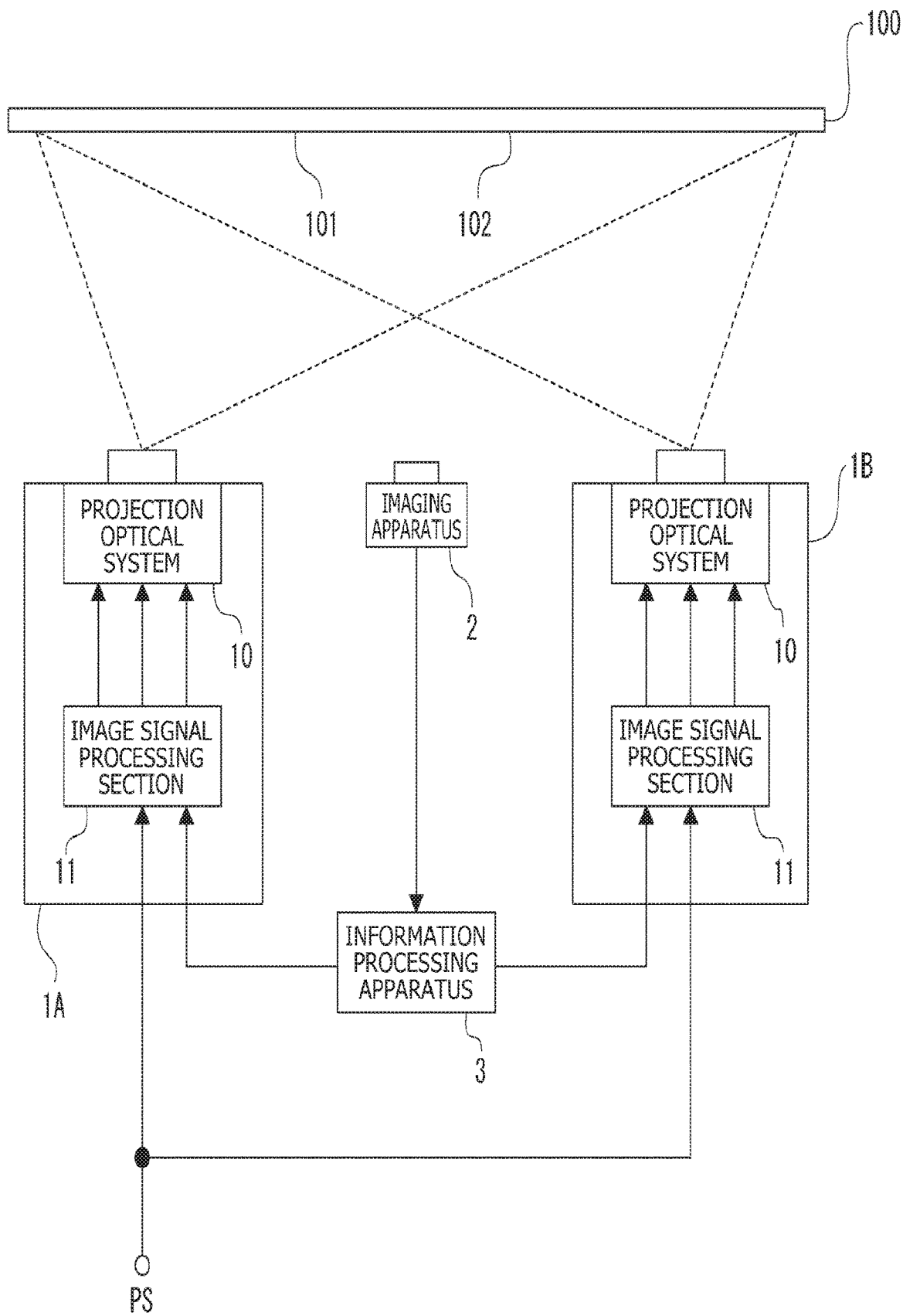
FIG. 2 is a block diagram of a projection system according to the embodiment.

An embodiment will be described below in the following order.

<1. Projection System Configuration for Superimposition Display>
<2. Configuration of Information Processing Apparatus>
<3. Correction Processing Procedure>
<4. Processing of Information Processing Apparatus>
<5. Summary and Modifications>

1. Projection System Configuration for Superimposition Display

First, examples of superimposition display using a projection system according to the embodiment will be described with reference to FIGS. 1A and 1B.

FIG. 1A schematically illustrates stack projection in which two projectors 1 (1A and 1B) are arranged side by side and their respective projection images are entirely superimposed on each other (a shaded portion).

It is noted that, for the sake of description, in a case where the projectors are collectively referred to, the projectors will be referred to as "projectors 1." A projector 1 that serves as a base for alignment will be referred to as a "base projector 1A," while a projector 1 other than the base projector 1A will be referred to as a "referencing projector 1B," as described later. The base projector 1A and the referencing projector 1B do not require structural differences, and the one that is selected as a base for alignment serves as the base projector 1A. For example, in a case where there are two projectors 1 having exactly the same structure, one of the projectors 1 serves as the base projector 1A.

Further, for the sake of simplicity, description will be given of the case of using the two projectors 1. However, superimposition display is, in some cases, performed using there or more projectors 1. In this case, one of the projectors 1 serves as the base projector 1A while the other plurality of projectors 1 serves as the referencing projectors 1B.

Moreover, in the case of using three or more projectors 1, one specific projector 1 is not necessarily required to serve as the base projector 1A all the time. It is sufficient that any projector 1 that is used as a base for position adjustment serves as the base projector 1A.

In the case of the stack projection of FIG. 1A, each of projection images 101 and 102 projected by the respective two projectors 1 (1A and 1B) is displayed in the same range on a screen 100. Thus, the entire projection images 101 and 102 are superimposed on each other.

It is noted that the entire herein is not limited to a situation where the individual projection images exactly match with each other. For example, "entirely superimposed" also includes a situation where, in terms of pixel level, corresponding respective pixels are deviated from one another by a ½ pixel pitch.

That is, in the present embodiment, displaying the entire projection image of each of the plurality of projectors 1 in the same region on the screen will be referred to as stack projection in which the entire projection images are superimposed on each other, even if there is slight positional deviation.

In the case of this stack projection, it is possible to achieve higher brightness during image display as the identical images projected by the respective projectors 1 match at the pixel level more, for example.

Further, in a case where corresponding respective pixels of the projection images are set so as to be deviated from each other by, for example, ½ pixel in the diagonal direction, this setting is mainly effective for the improvement of the resolution.

FIG. 1B schematically illustrates tiling projection in which the two projectors 1 (1A and 1B) are arranged side by side and their respective projection images 101 and 102 are partially superimposed on each other.

In this case, for example, a right end portion of the projection image 101 projected by the base projector 1A and a left end portion of the projection image 102 projected by the referencing projector 1B are the same image. With these portions superimposed on each other as illustrated as a shaded portion, a laterally long image can be displayed.

Such tiling projection can also be performed with three or more projectors 1. For example, the referencing projector 1B is arranged on each of the left and right sides of the base projector 1A such that a part of each image is displayed in a superimposed manner. With this arrangement, a laterally longer image can be displayed.

The width of a superimposition region in the tiling projection is only required to be determined depending on the projection system. For example, the superimposition display is not limited to being performed in a longitudinally long region, as illustrated in FIG. 1B, that is obtained by decreasing the width of the superimposition portion. The superimposition display may be performed in a square-like region or a laterally long region obtained by increasing the width of the superimposition portion.

Moreover, it is also conceivable to project images such that the images become continuous in the vertical direction. Moreover, it is also conceivable to use four projectors 1 to project images such that the images become continuous in the vertical and horizontal directions.

FIG. 2 illustrates an example of the projection system that performs stack projection or tiling projection as in the above examples.

The projection system according to the present embodiment includes the plurality (two in the figure) of projectors 1, an imaging apparatus 2, and an information processing apparatus 3. Each of the plurality of projectors 1 serves as the base projector 1A or the referencing projector 1B.

For example, the base projector 1A and the referencing projector 1B are arranged so as to perform stack projection on the screen 100.

Each of the base projector 1A and the referencing projector 1B includes a projection optical system 10 and an image signal processing section 11.

An image signal PS from an external apparatus that serves as an image source is input into each of the image signal processing sections 11 of the base projector 1A and the referencing projector 1B.

The image signal processing section 11 of each of the projectors 1 (1A and 1B) performs various types of processing such as various types of correction processing, gamma processing, color processing, brightness processing, contrast adjustment, sharpness adjustment, cutout and enlargement/reduction of an input image for creating a display image, and the like, and supplies R (red), G (green), and B (blue) image signals to the corresponding projection optical system 10.

It is noted that the correction processing performed by the image signal processing section 11 includes correction filter processing (inverse filter processing) as positional deviation correction and lens blur correction, which will be described later, and geometric correction processing for alignment. Accordingly, R signals, G signals, and B signals as various corrected image signals are supplied to the corresponding projection optical system 10.

The projection optical system 10 includes, for example, a light source section, a light modulation section, a projection lens system, and the like. The projection optical system 10 projects an image on the basis of R, G, and B image signals, causing the screen 100 to display the image.

For example, various types of light sources such as an LED (Light Emitting Diode), a laser light source, a xenon lamp, and a mercury lamp can be considered as the light source section of the projection optical system 10.

As an example, R, G, and B liquid crystal light valves can be expected as the light modulation section of the projection optical system 10. That is, the projection optical system 10 receives R, G, and B image data from the image signal processing section 11 and generates R image signals, G image signals, and B image signals as liquid crystal drive signals from the R, G, and B image data, respectively. The projection optical system 10 supplies the R, G, and B image signals to the respective R, G, and B liquid crystal light valves, causing the R, G, and B liquid crystal light valves to display a red image, a green image, and a blue image, respectively.

In the projection optical system 10, light from the light source section is separated into R light, G light, and B light, which then pass through the respective R, G, and B liquid crystal light valves. Accordingly, a beam of projection light of each of the red image, the green image, and the blue image is formed. These beams of projection light are combined and then projected by the projection lens system. Accordingly, a color image is projected and displayed on the screen 100.

The projection lens system can perform not only the above-described projection but also focus adjustment, image size adjustment, projection angle adjustment, and the like of the projection image.

The imaging apparatus 2 is arranged such that the imaging apparatus 2 can capture the projection image 101 and the projection image 102 projected on the screen 100. The imaging apparatus 2 is not necessarily required to be fixedly arranged. In particular, the imaging apparatus 2 may be installed when it is necessary to perform the positional deviation correction and the lens blur correction, which will be described later.

Further, the imaging apparatus 2 may allow an adjustment operator to manually capture a projection image on the screen 100. Alternatively, for example, the information processing apparatus 3 or another control apparatus can automatically control the angle of view, an image capturing direction, release timing, and the like of the imaging apparatus 2 to capture an image necessary for the positional deviation correction and the lens blur correction, which will be described later.

The information processing apparatus 3 uses the image captured by the imaging apparatus 2 to compute information necessary for performing the positional deviation correction and the lens blur correction for each projector 1.

Further, in some cases, the information processing apparatus 3 uses such information to generate a filter coefficient as an inverse filter for the positional deviation correction and the lens blur correction.

The information calculated by the information processing apparatus 3 is supplied to the image signal processing section 11 of each projector 1 and used for the correction processing (inverse filter processing).

Such an information processing apparatus may be configured as a control apparatus dedicated to the projection system or may be implemented by using a general-purpose personal computer. Moreover, the information processing apparatus can be implemented by using a mobile terminal apparatus such as a smartphone. In any case, any apparatus can be applied as the information processing apparatus 3 as long as the apparatus has a computation processing capability. A computation apparatus such as an internal microcomputer performs processing on the basis of predetermined software, so that information necessary for the correction operation of each projector 1 can be obtained in the projection system.

It is noted that the information processing apparatus 3 may be connected online to each projector 1 at all times or may be an offline apparatus that can transmit information to each projector 1 via a predetermined recording medium or by temporarily performing communication, for example.

Figure 3:
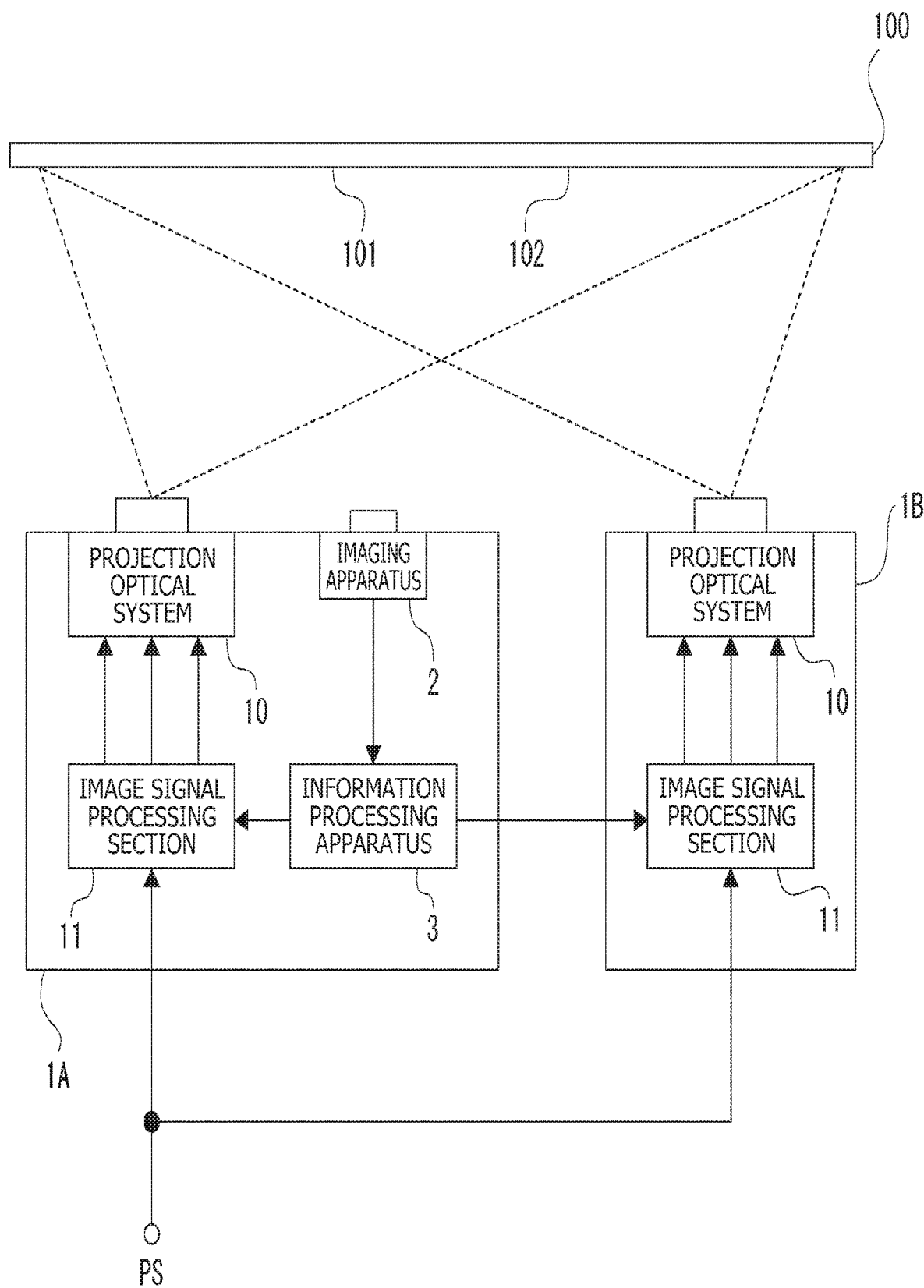
FIG. 3 is a block diagram of another example of the projection system according to the embodiment.

The above-described configuration illustrated in FIG. 2 is an example, and various other configurations are expected. FIG. 3 is an example of another configuration example.

The example of FIG. 3 is an example in which the information processing apparatus 3 and the imaging apparatus 2 are incorporated in the base projector 1A.

The imaging apparatus 2 is incorporated in the base projector 1A, captures an image (projection image on the screen 100) necessary for correction, and transfers the captured image to the information processing apparatus 3.

The information processing apparatus 3 is implemented by a microcomputer, a CPU (Central Processing Unit), a DSP (Digital Signal Processor), or the like incorporated in the base projector 1A. Further, the information processing apparatus 3 can provide information obtained from the computation result to the image signal processing section 11 and also transmit the information to the image signal processing section 11 of the other referencing projector 1B.

It is noted that a microcomputer similar to that of the information processing apparatus 3 can also be incorporated in the referencing projector 1B side such that the microcomputer performs various information communications, shares computation processing with the information processing apparatus 3, and the like, for example.

As another conceivable configuration example other than the example illustrated in FIG. 3, the information processing apparatus 3 is incorporated in the projector 1 while the imaging apparatus 2 is a separate body, for example.

<2. Configuration of Information Processing Apparatus>

A hardware configuration of the information processing apparatus 3 and a functional configuration implemented by software will be described.

Figure 4:
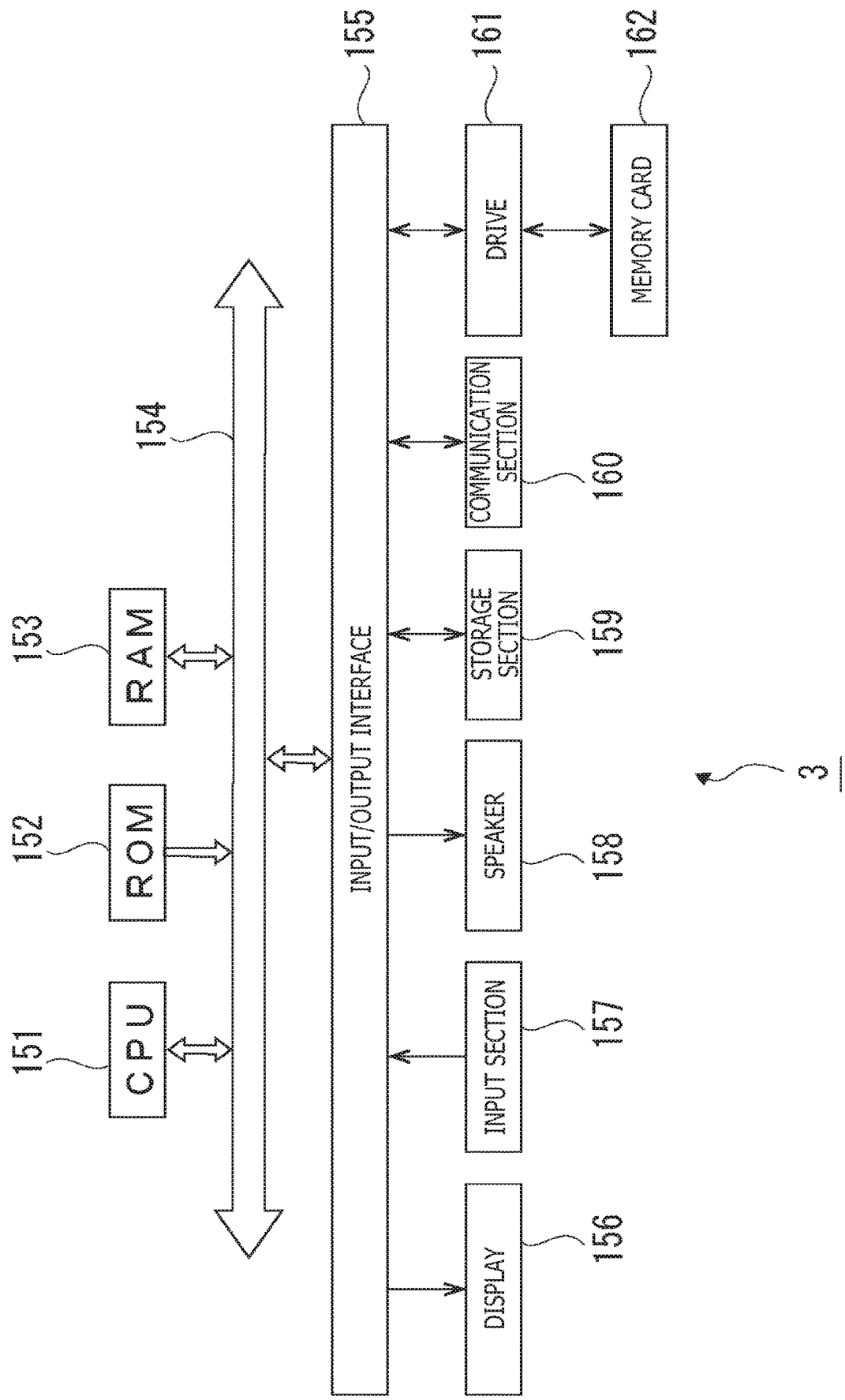
FIG. 4 is a block diagram of a hardware configuration of an information processing apparatus according to the embodiment.

The information processing apparatus 3 is implemented by the hardware configuration as illustrated in FIG. 4, for example.

As illustrated in FIG. 4, the information processing apparatus 3 includes a CPU 151, a ROM (Read Only Memory) 152, and a RAM (Random Access Memory) 153.

The CPU 151 performs various types of processing according to a program stored in the ROM 152 or a program loaded from a storage section 159 to the RAM 153. The RAM 153 also appropriately stores data and the like necessary for the CPU 151 to perform various types of processing.

The CPU 151, the ROM 152, and the RAM 153 are mutually connected to each other via a bus 154. An input/output interface 155 is also connected to the bus 154.

A display 156, an input section 157, a speaker 158, the storage section 159, a communication section 160, and the like can be connected to the input/output interface 155. The display 156 includes a liquid crystal panel, an organic EL (Electroluminescence) panel, or the like. The input section 157 includes a keyboard, a mouse, and the like. The storage section 159 includes an HDD (Hard Disk Drive) and the like.

The display 156 may be integrated with the information processing apparatus 3 or may be separate equipment. For example, the display 156 displays a captured image, a computation result, an operation menu, and the like.

The input section 157 indicates an input device used by a user who uses the information processing apparatus 3 (e.g., an adjustment operator who adjusts the projection system).

The communication section 160 performs wired or wireless communication with equipment in each peripheral section. The communication section 160 may perform communication processing via a network including the Internet, so that necessary software can be downloaded or various types of information can be transmitted, for example.

A drive 161 is also connected to the input/output interface 155 as necessary, and a memory card 162 is attached. A computer program read out from the memory card 162 is installed in the storage section 159 as necessary, or data processed by the CPU 151 is stored. Needless to say, the drive 161 may be a recording/reproduction drive for a removable storage medium such as a magnetic disk, an optical disc, or a magneto-optical disc.

In this manner, the information processing apparatus 3 has a hardware configuration as a computer apparatus.

It is noted that the information processing apparatus 3 according to the embodiment is not limited to a single computer apparatus having the hardware configuration as illustrated in FIG. 4, and may be configured by systematizing a plurality of computer apparatuses. The plurality of computer apparatuses may be systematized by a LAN (Local Area Network) or the like or may be arranged at a remote site through a VPN (Virtual Private Network) or the like using the Internet or the like. The plurality of computer apparatuses may include a computer apparatus that can be used through a cloud computing service.

Further, the computer apparatus configured as illustrated in FIG. 4 can be implemented as a personal computer of a non-portable type, a laptop type, or the like, or a mobile terminal such as a tablet terminal or a smartphone. Moreover, the functions as the information processing apparatus 3 according to the present embodiment can be mounted in electronic equipment such as a dedicated apparatus having functions as the computer apparatus, an imaging apparatus, a monitor apparatus, or a facility management apparatus.

Figure 5:
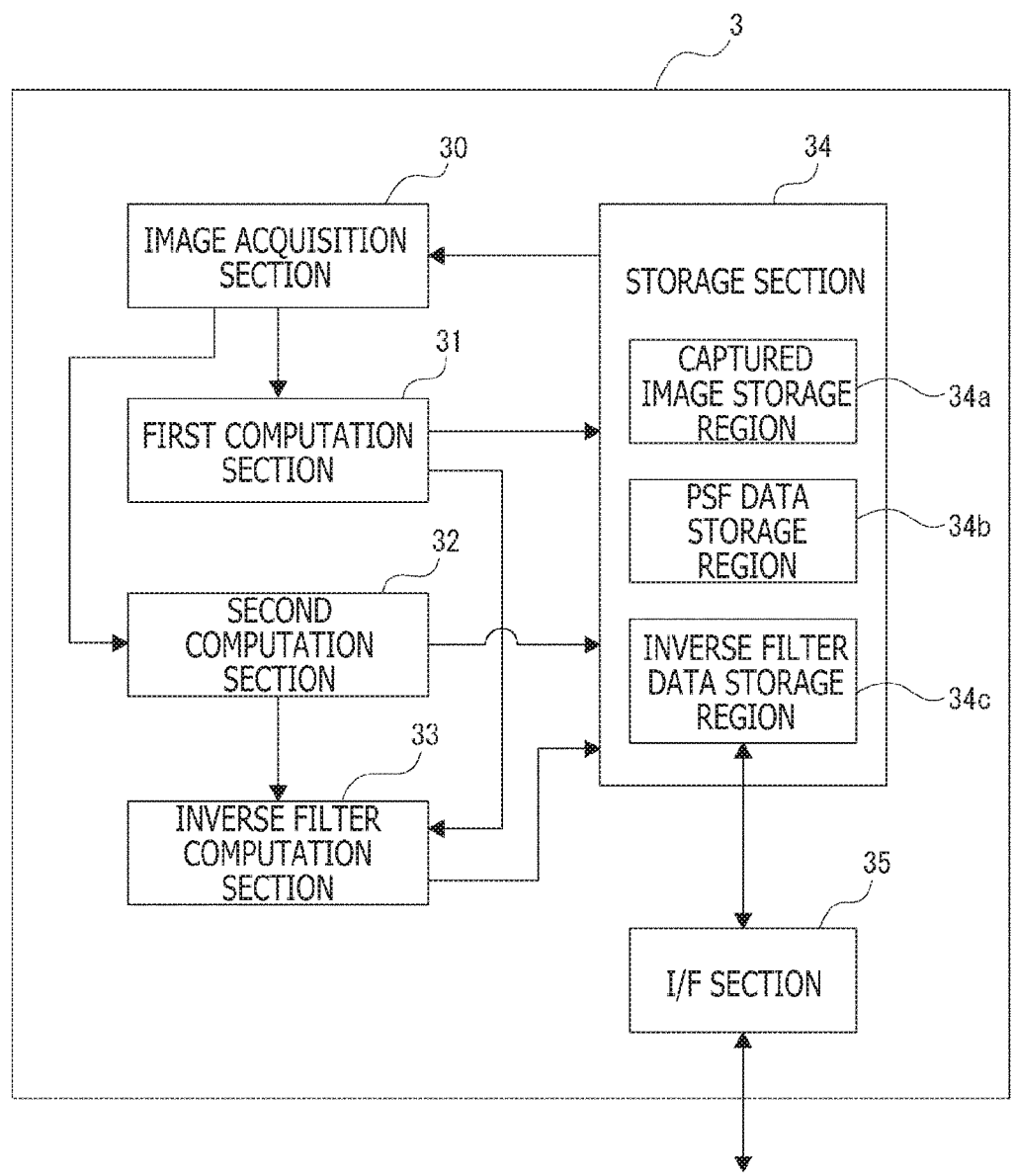
FIG. 5 is a diagram for describing a functional configuration of the information processing apparatus according to the embodiment.

The information processing apparatus 3 according to the embodiment with the above-described hardware configuration has functions as illustrated in FIG. 5 through cooperation between software and hardware. That is, the information processing apparatus 3 includes an image acquisition section 30, a first computation section 31, a second computation section 32, an inverse filter computation section 33, a storage section 34, and an interface section (I/F section) 35.

These functions are implemented by software activated by the CPU 151 of FIG. 4. A program included in the software is downloaded from the network or read out from a removable storage medium and then installed in the information processing apparatus 3. Alternatively, the program may be stored in advance in the HDD or the like as the storage section 159. Then, activating the program in the CPU 151 implements the function of each above-described section.

It is noted that the information processing apparatus 3 according to the embodiment is not necessarily required to include all of these sections. For example, a conceivable example is such that another information processing apparatus includes the inverse filter computation section 33.

The image acquisition section 30 has a function of acquiring image data (a captured image of a test pattern in a projection image described later) captured by the imaging apparatus 2.

The image data captured by the imaging apparatus 2 is loaded into the storage section 159 via the communication section 160 of FIG. 4 or loaded from the drive 161 into the storage section 159 via a recording medium such as the memory card 162, for example. Alternatively, the CPU 151 reads out the image data from the memory card 162 itself.

The storage functions of, for example, the above-described storage section 159, the memory card 162, and the like are collectively illustrated and referred to as the storage section 34 in FIG. 5.

In order to store information necessary for the processing according to the present embodiment, a captured image storage region 34a, a PSF data storage region 34b, and an inverse filter data storage region 34c are formed in the storage section 34.

It is noted that each of the captured image storage region 34a, the PSF data storage region 34b, and the inverse filter data storage region 34c does not indicate a fixed region on a storage device. Instead, it is indicated that the captured image storage region 34a, the PSF data storage region 34b, and the inverse filter data storage region 34c temporarily or permanently store captured image data, PSF data, and inverse filter data, respectively, as the storage section 34.

As described above, the storage section 34 (captured image storage region 34a) stores captured image data captured by the imaging apparatus 2. The image acquisition section 30 reads out a captured image of a processing target from captured images stored in the captured image storage region 34a at a necessary timing and transfers the captured image to the first computation section 31 or the second computation section 32.

The first computation section 31 performs first computation processing using captured image data obtained by capturing a test pattern projected on the screen 100 by the base projector 1A. The test pattern will be described later. In the first computation processing, the first computation section 31 calculates a PSF, that is, a light intensity distribution, for the base projector 1A, and peak coordinates of the PSF. The light intensity distribution indicates a degree of lens blur.

It is noted that, for the sake of description, PSF data refers to information regarding a light intensity distribution indicating a degree of lens blur of the projector 1 and obtained from the captured image.

The first computation section 31 causes the PSF data storage region 34b of the storage section 34 to store information regarding the PSF data and its peak coordinates that have been calculated.

The second computation section 32 calculates, using captured image data obtained by capturing the test pattern projected on the screen 100 by the referencing projector 1B, a light intensity distribution (PSF data) centered on the peak coordinates obtained by the first computation section 31 and corresponding to a degree of lens blur of the referencing projector 1B. Then, the second computation section 32 causes the PSF data storage region 34b of the storage section 34 to store the calculated PSF data.

The information calculated by the first computation section 31 and the second computation section 32 is provided to the inverse filter computation section 33 directly or via the storage section 34.

The inverse filter computation section 33 performs processing of generating inverse filters using the information regarding the PSF data and its peak coordinates calculated by the first computation section 31 and the PSF data calculated by the second computation section 32. The inverse filters are applied to image signal processing of the respective projectors 1.

Then, the inverse filter computation section 33 causes the inverse filter data storage region 34 of the storage section 34 to store a filter coefficient group as the generated inverse filters.

For example, in a case where the two projectors 1 are arranged and one projector 1 serves as the base projector 1A while the other projector 1 serves as the referencing projector 1B as illustrated in FIG. 2, the inverse filter computation section 33 generates an inverse filter for the base projector 1A and an inverse filter for the referencing projector 1B.

In a case where three or more projectors 1 are arranged and there is a plurality of referencing projectors 1B, the inverse filter computation section 33 generates an inverse filter corresponding to each of the referencing projectors 1B. Needless to say, in this case, the second computation section 32 calculates PSF data for each referencing projector 1B.

The interface section 35 indicates the function for the CPU 151 to perform transmission/reception via the communication section 160 of FIG. 4, for example. The interface section 35 transmits information obtained by the information processing apparatus 3 to another equipment or another section. Specifically, the interface section 35 transmits inverse filter data stored in the inverse filter data storage region 34 to the image signal processing section 11 of each projector 1.

Alternatively, the PSF data stored in the PSF data storage region 34b is, in some cases, transmitted to another information processing apparatus or the projector 1.

In any case, the information processing apparatus 3 uses the function of the interface section 35 to transmit necessary information with which the image signal processing section 11 of each projector 1 can perform necessary correction processing.

<3. Correction Processing Procedure>

A correction processing procedure performed in the projection system according to the present embodiment will be described below. It is noted that here, the procedure performed by the entire projection system will be described with reference to FIG. 6.

Figure 6:
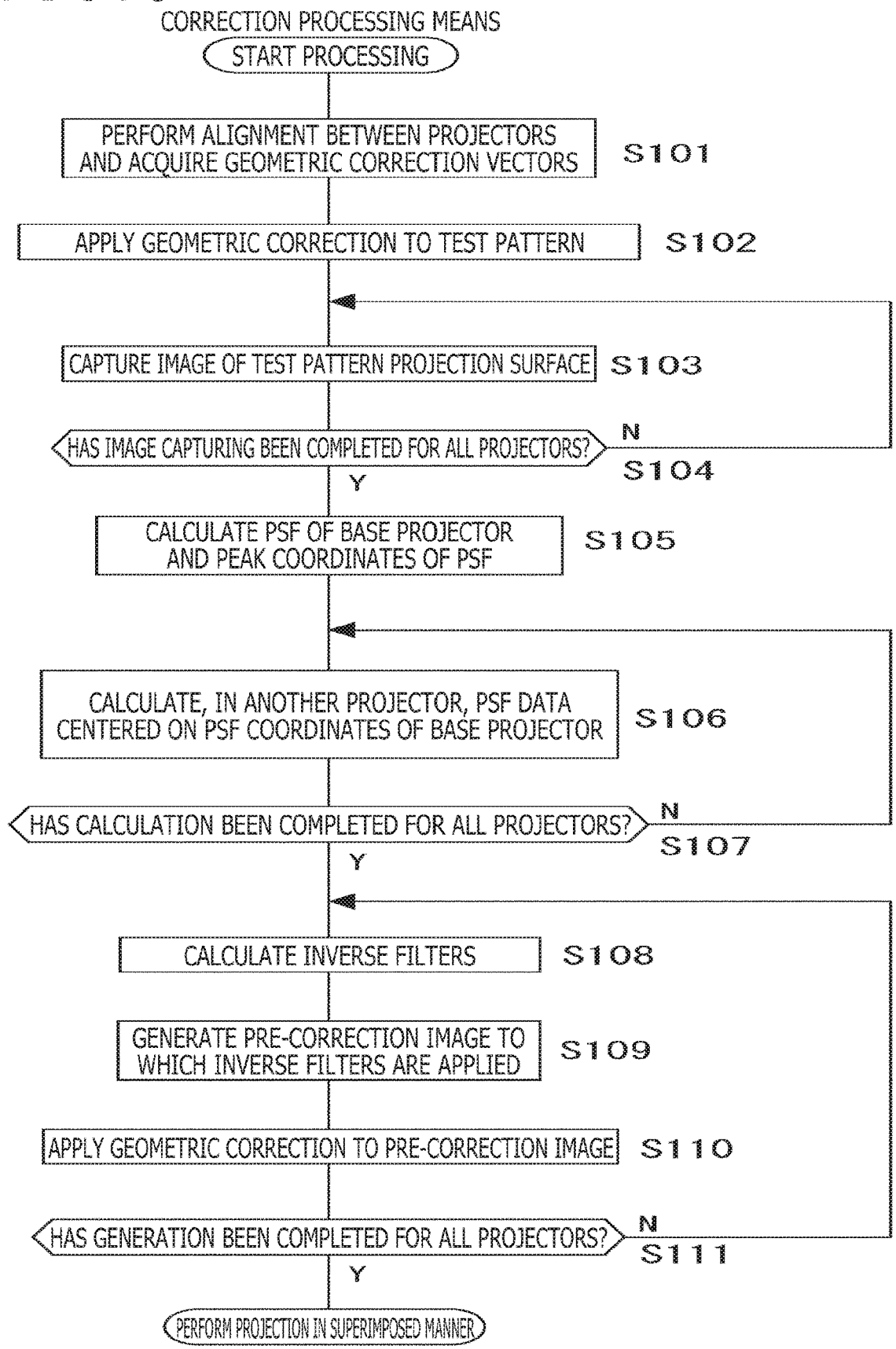
FIG. 6 is a flowchart of a correction processing procedure in the projection system according to the embodiment.

FIG. 6 illustrates an example of the correction processing procedure performed in the projection system including the base projector 1A, the referencing projector 1B, the imaging apparatus 2, and the information processing apparatus 3.

First, in step S101, alignment between the projectors 1 is performed in a unit of a pixel. An existing general method can be employed for this alignment.

By detecting what range on the screen 100 each projector 1 projects pixels, this alignment makes projection ranges of the respective projectors 1 correspond to each other. Then, for example, in the case of stack projection, geometric correction data for matching the entire projection ranges (in the case of tiling projection, matching predetermined ranges) is generated.

In a case where the plurality of projectors 1 performs projection on the screen 100, at least one (or all) projector(s) 1 does (do) not directly face the screen 100. Therefore, a projection image results in a trapezoidal shape. Although adjustment can be roughly performed through lens adjustment of the projection optical system, the projection image can be made into an appropriate rectangular shape by further performing geometric correction such that inverse transformation is performed on the trapezoid through image processing. In step S101, a geometric correction vector is acquired for this purpose. Specifically, a test pattern for geometric correction is projected by each projector 1, and a geometric correction vector is obtained from a captured image thereof.

Although not described in FIG. 5 above, the information processing apparatus 3 may calculate such a geometric correction vector and provide geometric correction information to each projector 1.

In step S102, in each projector 1, geometric correction is applied to the projection image according to the corresponding geometric correction vector obtained in step S101. Then, each projector 1 is brought into a state of projecting a test pattern for the lens blur correction and the positional deviation correction. That is, each projector 1 projects the geometrically corrected test pattern.

For example, the test pattern includes a pattern such as one dot or a polka dot that can acquire PSF data and that is arranged as part of the projection surface. The test pattern includes a plurality of such patterns arranged throughout the projection surface.

For example, FIG. 7A illustrates a sub test pattern STP, while FIG. 7B illustrates a test pattern 90. The sub test pattern STP is an example in which a total of 35 one-pixel dots, that is, 7 dots in the lateral direction×5 dots in the longitudinal direction, are arranged in a rectangular frame W. Needless to say, the number of dots is not limited thereto.

In the test pattern 90 that is in use, for example, the above-described sub test pattern STP is arranged in nine regions, that is, three regions in the lateral direction×three regions in the longitudinal direction (top left, top center, top right, center left, center, center right, bottom left, bottom center, and bottom right) on the projection image, as illustrated in FIG. 7B.

By using such a pattern as the test pattern 90, it is possible to obtain the PSF and the positional deviation that locally change on the projection surface. Needless to say, the test pattern 90 is not limited to this example.

After the test pattern 90 is geometrically corrected, the test pattern 90 is projected by each projector 1. Examples of geometrically corrected test patterns 90AH and 90BH are illustrated in the upper part of FIG. 8.

While both the test patterns 90AH and 90BH are the same test pattern 90, the test patterns 90AH and 90BH are examples of the test pattern 90 that has been geometrically corrected so as to correspond to the respective projectors 1.

Here, the test pattern 90AH is illustrated on the base projector 1A side as a case where the test pattern 90AH is projected in an appropriate rectangular shape without geometric correction (or with a little correction). Meanwhile, the test pattern 90BH is illustrated on the referencing projector 1B side. The test pattern 90BH is obtained by inversely performing geometric correction on the trapezoidal projection image.

In steps S103 and S104, the geometrically corrected test pattern 90 is projected by each projector 1 and is captured by the imaging apparatus 2.

For example, in step S103, the test pattern 90AH is first projected by the base projector 1A and captured by the imaging apparatus 2. Then, the captured image data is saved. After that, a similar operation is performed by returning from steps S104 to S103 until the operation is completed for all the projectors 1. Therefore, the test pattern 90BH is subsequently projected by the referencing projector 1B and image-captured by the imaging apparatus 2. Then, the captured image data is saved.

Basically, image capturing is performed, targeting the individual sub test patterns STP of each of these projection images. The captured image data of each sub test pattern STP is, for example, stored in the storage section 34 of the information processing apparatus 3.

Figure 8:
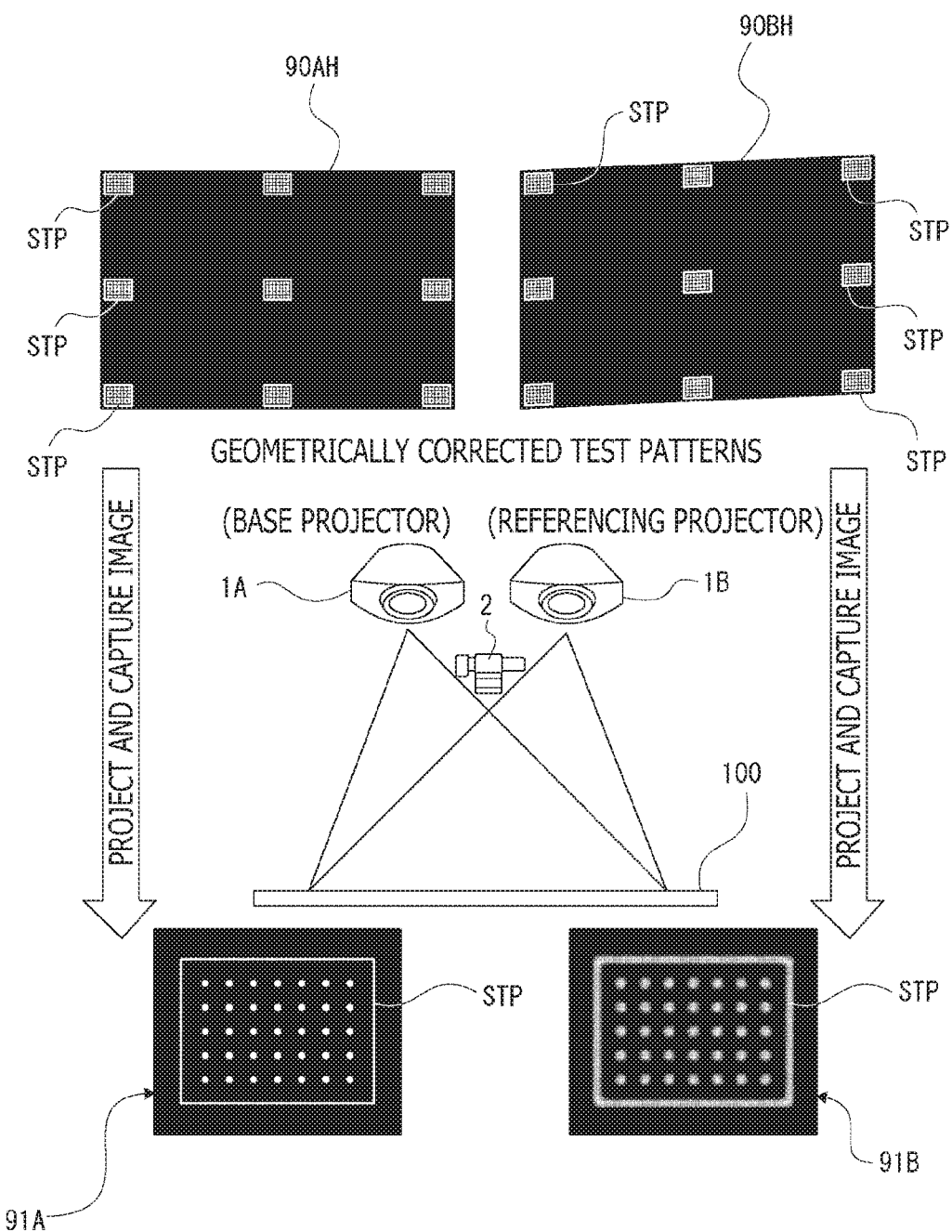
FIG. 8 is a diagram for describing an overview of correction processing according to the embodiment.

In the step S103, the test pattern 90, on which the geometric correction has been performed so as to correspond to each projector 1, is projected. The imaging apparatus 2 is installed at a location where the imaging apparatus 2 can capture remaining positional deviation and a location for acquiring the PSF. Then, the imaging apparatus 2 captures an image. At this time, the imaging apparatus 2 is desirably installed such that the imaging apparatus 2 directly faces the screen 100 as much as possible as illustrated in FIG. 8. In a case where the imaging apparatus 2 cannot directly face the screen 100, it is sufficient if a projective transformation matrix is obtained from image distortion caused by the influence of the installation position and then inverse transformation is performed therewith.

Further, as long as the necessary portion (sub test pattern STP) in the test pattern 90 is included within the camera angle of view, it is not necessary to capture such a wide-angle image that the entire projection image can be captured. In a case where the imaging apparatus 2 is set and arranged such that each sub test pattern STP of the test pattern 90 is included within the full angle of view, the positional deviation and the PSF can be acquired more finely, leading to an improvement of correction performance. For example, in the case of the test pattern 90 of FIG. 7B, when the test pattern 90 is projected by one projector 1, each of the nine sub test patterns STP is preferably captured with a full angle of view (that is, nine captured images are obtained).

In the lower part of FIG. 8, each of a captured image 91A of the sub test pattern STP of the test pattern 90AH projected by the base projector 1A and a captured image 91B of the sub test pattern STP of the test pattern 90BH projected by the referencing projector 1B is illustrated. For example, such image capturing is performed by the imaging apparatus 2, and the captured image data is provided to the information processing apparatus 3 each time or collectively at a later time.

On the other hand, in a case where the imaging apparatus 2 is set and arranged such that a plurality of sub test patterns STP is included within the angle of view, it is possible to acquire the amount of positional deviation and the PSF at each of a plurality of locations by one image capturing. This leads to saving labor during the correction procedure.

Needless to say, another conceivable example is to capture only one image for each projector 1 by capturing the entire test pattern 90.

It is noted that a plurality of dots is enclosed by the frame W in the sub test pattern STP of FIG. 7A. Providing the frame W facilitates the detection of an image region of the sub test pattern STP when the captured image is analyzed.

After the above-described image capturing is completed, PSF calculation is performed by the information processing apparatus 3 in steps S105, S106, and S107.

In step S105, the information processing apparatus 3 first calculates PSF data of the base projector 1A as a base for alignment and peak coordinates of the PSF data in captured image data from a captured image of the test pattern of each projector 1.

The PSF calculation from the captured image data of the test pattern 90 can be performed by separating image-capturing noise and dots through existing image processing such as binarization and labeling processing.

Here, the information processing apparatus 3 extracts a PSF region (that is, a region in which any dot of the sub test pattern STP is captured) from the captured image of the test pattern 90 projected by the base projector 1A. After that, the information processing apparatus 3 acquires a peak pixel from the pixels extracted as the PSF and calculates the coordinates of the peak pixel in the image as the peak coordinates of the PSF of the base projector 1A.

The image is reduced with the peak coordinates as the center using a scaling parameter that is determined by the number of pixels in the dot intervals in the test pattern 90 and the captured image. Accordingly, the spread of light of one pixel of the projector, that is, a PSF on a projector scale, can be acquired.

FIG. 9A illustrates an example of the captured image 91A of the sub test pattern STP. FIG. 9B illustrates examples of a PSF on a camera scale. FIG. 9C illustrates examples of a PSF on the projector scale.

It is noted that in FIGS. 9B and 9C, the color strength corresponds to the light intensity. FIG. 9B illustrates, by shading, a light intensity distribution of a certain dot portion in the sub test pattern STP on a captured image plane. FIG. 9C illustrates, by shading, a light intensity distribution in a unit of a pixel of the projector 1.

Next, in step S106, the information processing apparatus 3 obtains a PSF for the referencing projector 1B. From the captured image of the test pattern 90 projected by the referencing projector 1B, the information processing apparatus 3 extracts a PSF region corresponding to the base projector 1A (that is, a captured region of a dot in the sub test pattern STP corresponding to the dot used by the computation on the base projector 1A side). After that, the information processing apparatus 3 obtains a PSF on the projector scale centered on the peak coordinates that have been obtained on the base projector side (see FIGS. 9A, 9B, and 9C).

The process in step S106 is repeated until the process is completed for all the projectors 1 in step S107. That is, in a case where there is a plurality of referencing projectors 1B, the process in step S106 is performed for each referencing projector 1B.

The processes using the captured image data for the base projector 1A and the referencing projector 1B in steps S105, S106, and S107 described above will be described in detail later.

Figure 10:
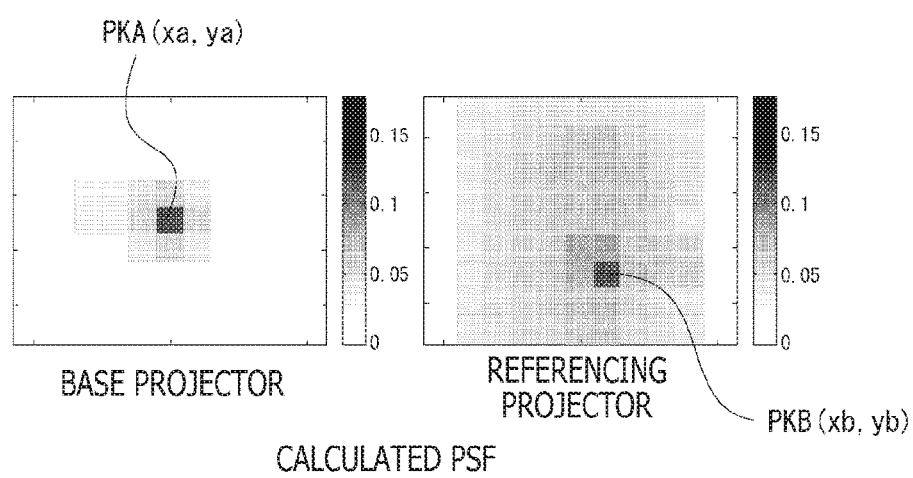
FIG. 10 is a diagram for describing calculated PSFs according to the embodiment.

Here, FIG. 10 illustrates a projector scale PSF for the captured image of the test pattern of each of the base projector 1A and the referencing projector 1B.

As illustrated in the figure, peak coordinates PKA (coordinates (xa, ya)) on the base projector 1A side and peak coordinates PKB (coordinates (xb, yb)) of the PSF on the referencing projector 1B side obtained with the peak coordinates PKA as the center do not match in some cases. That is, the peak of the projector scale PSF on the referencing projector 1B side is not the coordinate center.

This means that the deviation (separation distance and direction) of the peak coordinates (xb, yb) on the referencing projector 1B side from the coordinate center (xa, ya) is namely the positional deviation that has not been completely aligned yet.

That is, FIG. 10 illustrates images of the PSF of the base projector having the peak at the center and the PSF of the referencing projector including the positional deviation as the peak deviation in this manner.

Figure 11:
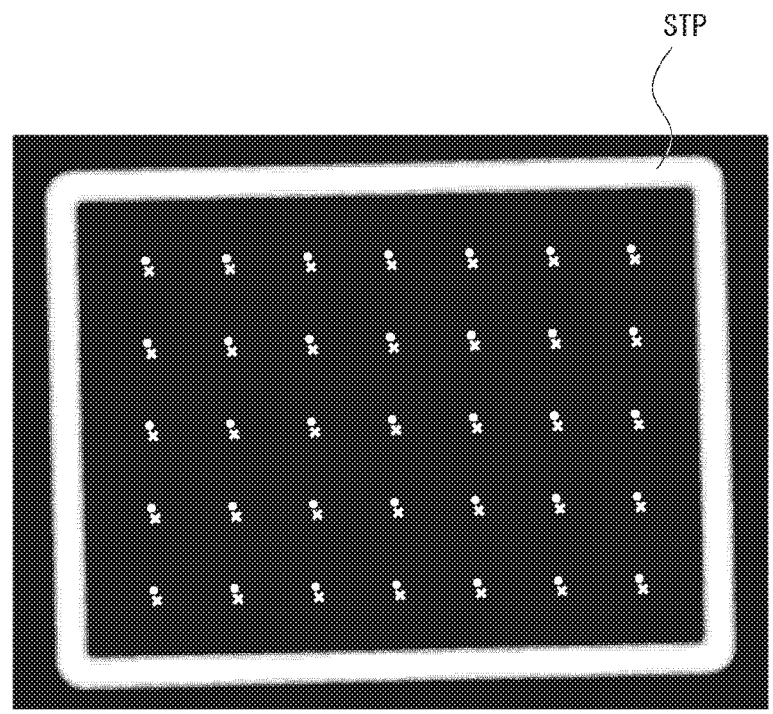
FIG. 11 is a diagram for describing PSF peaks according to the embodiment.

Further, FIG. 11 illustrates the peaks of individual dots of the base projector 1A and the referencing projector 1B that are plotted in the captured image of the test pattern of the referencing projector 1B. In FIG. 11, ○ indicates the peak of each dot on the base projector 1A side, while × indicates the peak of each dot on the referencing projector 1B side.

Subsequently, the inverse filter calculation is performed in step S108 as the correction procedure of FIG. 6. The inverse filter calculation is performed by the information processing apparatus 3 or another computation apparatus.

In this case, inverse filters for the respective projectors 1 are generated from the corresponding PSF data for the base projector 1A side having the peak as the center and the corresponding PSF data for the referencing projector 1B side including the positional deviation as the peak deviation as illustrated in FIG. 10. Filter coefficients as the generated inverse filters are provided to the image signal processing sections 11 of the respective projectors 1.

Then, in step S109, the image signal processing section 11 of each projector 1 performs image correction to which the inverse filters are applied on the projection image. That is, the filter coefficients as the inverse filters are set.

Such inverse filter processing can be performed using an existing method such as a wiener filter.

An image obtained by the inverse filter processing is an image in which the positional deviation and lens blur caused by performing projection in a superimposed manner have been corrected in advance. This image is referred to as a pre-correction image in FIG. 6.

A pre-correction image on the base projector 1A side is an image in which only the lens blur has been corrected by the inverse filter processing for the base projector 1A. Meanwhile, a pre-correction image on the referencing projector 1B side is an image in which both the positional deviation and the lens blur have been corrected by the inverse filter processing for the referencing projector 1B.

Further, in step S110, each projector 1 sets correction processing such that the corresponding image signal processing section 11 applies the geometric correction to the pre-correction image.

The correction processing is set such that the geometric correction is performed on the pre-correction image created by the corresponding projector using the geometric correction vector acquired in step S101 in advance, and image projection is performed.

By performing the above-described steps S108, S109, and S110 for all the projectors 1, a series of correction processing procedure is completed in step S111. After that, projection is performed in a superimposed manner in the corrected state.

4. Processing of Information Processing Apparatus

An example of processing performed by the information processing apparatus 3 according to the embodiment in the above-described correction processing procedure will be described with reference to FIG. 12. That is, FIG. 12 is a specific example of the procedure in steps S105, S106, and S107 of FIG. 6 described above.

The information processing apparatus 3 performs the following processing with the functions described with reference to FIG. 5.

Figure 12:
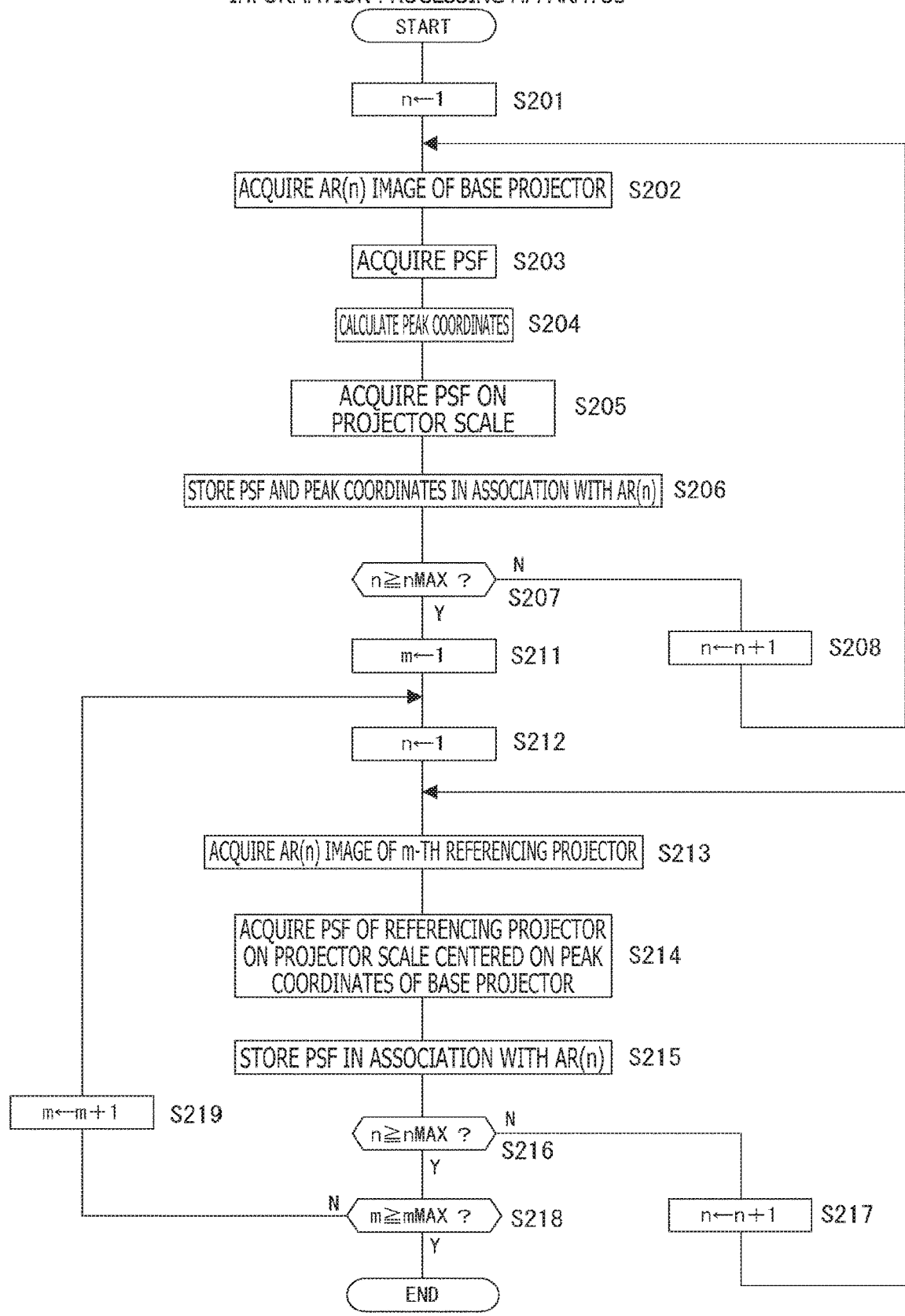
FIG. 12 is a flowchart of a processing example of the information processing apparatus according to the embodiment.

In FIG. 12, the information processing apparatus 3 first performs processes corresponding to step S105 of FIG. 6 as steps S201 to S208.

In step S201, the information processing apparatus 3 sets a variable n=1. The variable n is a variable for sequentially specifying the captured images (91A, 91B) of the plurality of sub test patterns STP in the test pattern 90.

As illustrated in FIG. 7B, the test pattern 90 includes the nine sub test patterns STP. Here, regions including the respective sub test patterns STP will be referred to as regions AR1 to AR9 as illustrated in FIG. 7B.

In step S202, the information processing apparatus 3 first acquires an image of the region AR(n) of the base projector 1A. Since the variable n=1 at the beginning, the information processing apparatus 3 acquires an image of the sub test pattern STP in the first region AR1.

In step S203, the information processing apparatus 3 acquires a PSF in the acquired image of the region AR(n). For example, the information processing apparatus 3 first calculates a PSF for the image of the sub test pattern STP in the region AR1.

In this case, although the sub test pattern STP in the region AR(n) has a plurality of dots, it is sufficient if one dot at the most center is selected and a PSF for this dot is obtained, for example. Needless to say, a PSF may be obtained for each of the 35 dots of the sub test pattern STP, for example.

In step S204, the information processing apparatus 3 calculates the peak coordinates for the obtained PSF.

Then, in step S205, the information processing apparatus 3 acquires a PSF on the projector scale by reducing the image with the peak coordinates as the center using a scaling parameter that is determined by the number of pixels in the dot intervals in the test pattern 90 and the captured image.

In step S206, the information processing apparatus 3 stores the obtained PSF data and peak coordinates in the storage section 34 in association with the region AR(n).

It is noted that, in a case where the PSF calculation is performed for one representative dot, one piece of PSF data and peak coordinates are stored for the region AR(n). On the other hand, for example, in a case where the PSF calculation is performed for each of the 35 dots, 35 pieces of PSF data and peak coordinates are stored for the region AR(n).

In the example described below, the PSF calculation is performed for one dot. However, performing the PSF calculation for a number of dots can improve the correction precision.

In step S207, the information processing apparatus 3 compares the variable n with a predetermined value nMAX, and checks whether or not the above processing has been completed for all the regions AR (e.g., AR1 to AR9).

The predetermined value nMAX refers to the number of regions. In the case of the test pattern 90 of FIG. 7B including the nine sub test patterns STP, nMAX=9.

In a case where the processing has not been completed for all the regions AR, the information processing apparatus 3 increments the variable n in step S208, returns to step S202, and similarly performs the processes in steps S202 to S206.

For the base projector 1A, therefore, each of the PSF data and the peak coordinates is calculated using each of the sub test patterns STP in the respective regions AR1 to AR9 of the test pattern 90, and then stored.

After the above processing is completed for all the regions AR1 to AR9 of the test pattern 90 for the base projector 1A, the information processing apparatus 3 proceeds from step S207 to S211 and performs processes corresponding to step S106 of FIG. 6 as steps S211 to S217.

The information processing apparatus 3 sets a variable m=1 in step S211 and sets the variable n=1 again that specifies the region AR in step S212. The variable m is a variable for specifying one or a plurality of referencing projectors 1B.

In step S213, the information processing apparatus 3 acquires an image of the region AR(n) of the m-th referencing projector 1B. Since the variable m=1 and the variable n=1 at the beginning, the information processing apparatus 3 acquires an image of the sub test pattern STP in the first region AR1 for the first referencing projector 1B.

In step S214, the information processing apparatus 3 acquires a PSF in the acquired image of the region AR(n). For example, the information processing apparatus 3 first calculates a PSF for the image of the sub test pattern STP in the region AR1.

It is noted that in this case, the information processing apparatus 3 obtains PSF data centered on the peak coordinates for the same dot as the dot for which PSF calculation has been performed for the corresponding region AR(n) of the base projector 1A. Then, as in the case of the base projector 1A, the information processing apparatus 3 acquires a PSF on the projector scale.

In step S215, the information processing apparatus 3 stores the obtained PSF data in the storage section 34 in association with the region AR(n).

In step S216, the information processing apparatus 3 compares the variable n with a predetermined value nMAX (e.g., nMAX=9), and checks whether or not the above processing has been completed for all the regions AR (e.g., AR1 to AR9).

In a case where the processing has not been completed for all the regions AR, the information processing apparatus 3 increments the variable n in step S217, returns to step S213, and similarly performs the processes in steps S213 to S215.

For one referencing projector 1B, therefore, each piece of PSF data is calculated using the sub test pattern STP in each of the regions AR1 to AR9 of the test pattern 90, and then stored. In this case, each piece of PSF data obtained is centered on the peak coordinates of a corresponding dot of a corresponding region AR in the base projector 1A.

After the above processing is completed for one referencing projector 1B, the information processing apparatus 3 compares the variable m with a predetermined value mMAX in step S218. In the case of the configuration illustrated in FIG. 2, mMAX=1. Thus, the processing ends.

In the case of a configuration where a plurality of referencing projectors 1B is arranged in the projection system, the predetermined value mMAX refers to the number of referencing projectors 1B. The information processing apparatus 3 increments the variable m in step S219 and returns to step S212 until the processing is completed for all the referencing projectors 1B. Then, the information processing apparatus 3 calculates a PSF for each of the regions AR1 to AR9 for the next referencing projector 1B.

The information processing apparatus 3 performs the above processing of FIG. 12, so that the PSF data and the peak coordinates in each region AR for the base projector 1A and the PSF data centered on the peak coordinates in each region AR for the referencing projector 1B are stored in the storage section 34.

By using such information, the information processing apparatus 3 or another apparatus can calculate inverse filters for simultaneously performing lens blur correction and positional deviation correction for the respective projectors 1.

Figure 13:
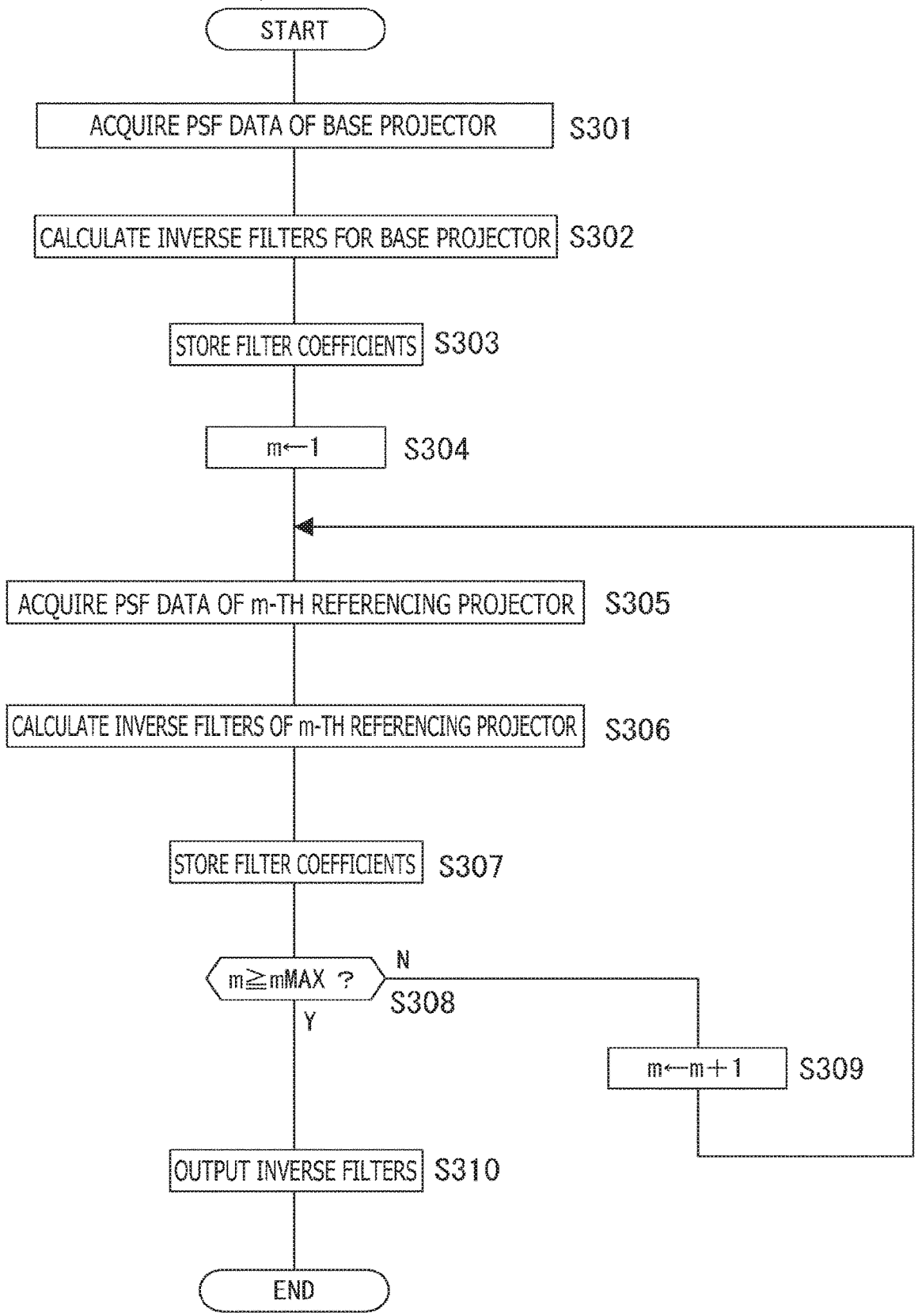
FIG. 13 is a flowchart of inverse filter computation/output processing performed by the information processing apparatus according to the embodiment.

FIG. 13 illustrates a processing example for a case where the information processing apparatus 3 performs inverse filter computation.

In step S301, the information processing apparatus 3 acquires PSF data of the base projector 1A. For example, the information processing apparatus 3 reads out PSF data for each of the regions AR1 to AR9 from the storage section 34.

Then, in step S302, the information processing apparatus 3 calculates inverse filters for the base projector 1A. Since the base projector 1A is the projector 1 selected as a base for alignment, the base projector 1A does not perform positional deviation correction. This is because just the referencing projector 1B needs to correct the positional deviation from the base projector 1A.

In addition, the PSF data for the base projector 1A includes information regarding the light intensity distribution that reflects the lens blur of the base projector 1A.

Therefore, for the base projector 1A, the PSF data for each of the regions AR1 to AR9 can be used to calculate an inverse filter coefficient for eliminating the lens blur for the corresponding region.

In step S303, the information processing apparatus 3 stores the filter coefficients of the inverse filters calculated for the base projector 1A in the storage section 34.

Next, the inverse filter computation is performed for the referencing projector 1B.

The information processing apparatus 3 sets the variable m=1 in step S304. Then, in step S305, the information processing apparatus 3 acquires PSF data for the m-th referencing projector 1B. For example, the information processing apparatus 3 reads out PSF data for the m-th referencing projector 1B for each of the regions AR1 to AR9 from the storage section 34.

Then, in step S306, the information processing apparatus 3 calculates inverse filters for the m-th referencing projector 1B.

An inverse filter for the referencing projector 1B is a filter for simultaneously performing the correction of the lens blur of the referencing projector 1B and the correction of the positional deviation from the projection image of the base projector 1A.

In this case, the PSF data for the referencing projector 1B includes not only information regarding the light intensity distribution that reflects the lens blur of the referencing projector 1B, but also information that reflects the amount of positional deviation from the projection image of the base projector 1A as the amount of peak deviation from the coordinate center (that is, the peak coordinates calculated for the base projector 1A side).

Therefore, for the referencing projector 1B, the PSF data for each of the regions AR1 to AR9 can be used to calculate an inverse filter coefficient for eliminating the lens blur and the positional deviation for the corresponding region.

In step S307, the information processing apparatus 3 stores the filter coefficients of the inverse filters calculated for the m-th referencing projector 1B in the storage section 34.

It is noted that since the coordinate center serving as a base for the amount of positional deviation is at the peak coordinates calculated for the base projector 1A side as described above, the information processing apparatus 3 also reads out information regarding the peak coordinates from the storage section 34 in step S305. However, one conceivable example is such that, as long as PSF data of the referencing projector 1B has been accurately obtained such that the coordinate center is at the above peak coordinates, the information processing apparatus 3 does not read out the peak coordinates since the information regarding the peak coordinates is included in this PSF data (as the coordinate center point).

In any case, the information processing apparatus 3 obtains an inverse filter using the corresponding PSF data obtained for the referencing projector 1B and the peak coordinates of the PSF data for the base projector 1A side.

After the above processing has been completed for one referencing projector 1B, the information processing apparatus 3 compares the variable m with the predetermined value mMAX in step S308.

The information processing apparatus 3 increments the variable m in step S309 and returns to step S305 until the processing is completed for all the referencing projectors 1B. Then, the information processing apparatus 3 performs the inverse filter computation for the next referencing projector 1B.

After the processing for the inverse filter computation is completed for all the referencing projectors 1B, the information processing apparatus 3 proceeds to step S310.

In step S310, the information processing apparatus 3 outputs the calculated inverse filters to the respective projectors 1. That is, the information processing apparatus 3 transmits the filter coefficients as the inverse filters generated for the base projector 1A to the image signal processing section 11 of the base projector 1A. Further, the information processing apparatus 3 transmits the filter coefficients as the inverse filters generated for the m-th referencing projector 1B to the image signal processing section 11 of the m-th referencing projector 1B.

Accordingly, the lens blur of the projection image can be corrected in the base projector 1A, while the lens blur and the positional deviation of the projection image can be simultaneously corrected in the referencing projector 1B.

As a result, superimposition display can be performed with high precision as the stack projection illustrated in FIG. 1A.

5. Summary and Modifications

The following effects can be obtained in the above-described embodiment.

The information processing apparatus 3 according to the embodiment includes the first computation section 31 (S201 to S208 of FIG. 12) that calculates a light intensity distribution indicating a degree of lens blur of the base projector 1A and its peak coordinates using a captured image obtained by capturing the test pattern 90 projected by the base projector 1A in an arrangement state in which the plurality of projectors 1 is arranged such that a part of or an entire projection image projected by each of the plurality of projectors is displayed in a superimposed manner.

Further, the information processing apparatus 3 includes the second computation section 32 (S211 to S219 of FIG. 12) that calculates a light intensity distribution centered on the peak coordinates on the base projector 1A side and corresponding to a degree of lens blur of the referencing projector 1B using a captured image obtained by capturing the test pattern 90 projected by the referencing projector 1B in the above-described arrangement state.

The PSF data of the base projector 1A (light intensity distribution indicating a degree of lens blur) and its peak coordinates and the PSF data of the referencing projector centered on the peak coordinates are obtained in this manner. Accordingly, information for correcting the positional deviation and the lens blur in the projection system can be easily and accurately obtained.

That is, inverse filters are calculated using the PSF data of the base projector 1A and its peak coordinates and the PSF data of the referencing projector centered on the peak coordinates. The image correction processing is performed on image signals to be projected using the inverse filters. Thus, in a case where there is a remaining positional deviation after the alignment of overlapping regions between the plurality of projectors 1, the lens blur of each projector 1 and the positional deviation can be corrected simultaneously.

This is because the PSF data includes not only information that reflects the amount of lens blur, but also information that reflects the amount of deviation of the projection image as the deviation of the center of the PSF of the referencing projector 1B from the peak coordinates of the base projector 1A.

Further, even in a case where the precision of the alignment in a unit of a pixel is low since, for example, the lens blur of the projector 1 is large or the imaging apparatus 2 used for the alignment does not have high resolution, the present embodiment can also be applied and high-quality image display can be realized as a result of the projection. For example, high-resolution display and high-brightness display can be easily and appropriately realized by the superimposition display.

Moreover, this also generates such advantages as increasing a variation of combinations that enable high-resolution image display including any projector 1 with large lens blur that is used for projection and reducing constraint on the specification of the imaging apparatus 2 to be used.

It is noted that although, in the embodiment, description has been mainly given of the case of stack projection, similar processing can also be performed for a superimposition display region in the case of tiling projection.

In the embodiment, from the captured image of the test pattern 90, the information processing apparatus 3 (first computation section 31) obtains, using a specific image (e.g., the sub test pattern STP) of the test pattern 90, PSF data (light intensity distribution) corresponding to a degree of lens blur of the base projector 1A in a unit of a pixel of the projection image and its peak coordinates.

With this configuration, it is possible to set peak coordinate values in a unit of a pixel that serve as a base for alignment.

In the example given in the embodiment, the sub test pattern STP as the specific image is set at each of a plurality of locations in the projection image of the test pattern 90.

For example, in the given example, the test pattern 90 is such that the sub test pattern STP can be observed at each of a plurality of locations in the superimposition display region of the projection image as illustrated in FIG. 7B. The information processing apparatus 3 obtains the PSF data and its peak coordinates for each of the sub test patterns STP (see FIG. 12).

With this configuration, it is possible to set coordinate values that serve as a base for alignment for each of the plurality of regions in the superimposition display region of the projection image.

The sub test pattern STP as the specific image according to the embodiment is an image including a one-pixel dot image.

For example, the test pattern 90 includes the sub test pattern STP including a one-pixel dot image. Accordingly, the dot image can be selected from the captured image to obtain a PSF. Since the PSF illustrated in this captured image expresses the spread of light of one pixel of the projector by using a plurality of pixels, the positional deviation can be detected in a unit of a pixel.

It is noted that various images other than the image of FIG. 7A can be considered as the sub test pattern STP.

For example, images as illustrated in FIGS. 14A, 14B, and 14C can be considered as the sub test pattern STP including dot images. Desirably, at least two dots are included as illustrated in FIG. 14B. This is because a dot distance can be used for transformation from the camera scale to the projector scale. More preferably, moreover, the sub test pattern STP includes dots arranged in the vertical direction and the horizontal direction as illustrated in FIGS. 14A and 14C. With this arrangement, these dots can be used as bases of the scales in the longitudinal direction and the lateral direction.

In the embodiment, the test pattern 90 is set such that the sub test pattern STP as the specific image is arranged at the center and each of the four corners of the superimposition region in the projection image.

Accordingly, the information processing apparatus 3 can obtain PSF data and its peak coordinates for each of the sub test patterns STP including the ones at the center and the four corners. For example, in a case where the superimposition display region is a square or a laterally long region, it is possible to set coordinate values that serve as a base for alignment for each appropriate region of the projection image.

It is noted that various examples other than FIG. 7B can be considered as examples of the arrangement of the sub test pattern STP in the test pattern 90. For example, one conceivable example is, as illustrated in FIG. 15A, to arrange the sub test pattern STP at the center and each of the four corners of the test pattern 90 as a minimum.

In the case of stack projection, arranging the sub test pattern STP at the center and each of the four corners in this manner is preferable for precise correction.

Needless to say, a larger number of sub test patterns STP may be arranged at locations including the center and the four corners.

Further, the sub test pattern STP as the specific image may be set only at the center or only at each of the upper and lower corners of the superimposition region in the projection image.

For example, assume tiling projection as illustrated in FIG. 1B. In this case, the base projector 1A side may project a test pattern 90A of FIG. 15B while the referencing projector 1B side may project a test pattern 90B as illustrated in FIG. 15C. In this case, the sub test pattern STP is projected at each of the upper and lower corners of the superimposition display portion (shaded portion) of FIG. 1B.

Further, the base projector 1A side may project a test pattern 90A of FIG. 15D while the referencing projector 1B side may project a test pattern 90B as illustrated in FIG. 15E. In this case, the sub test pattern STP is projected only at the center of the superimposition display portion (shaded portion) of FIG. 1B.

For example, in a case where the superimposition display region is a longitudinally long region, the information processing apparatus 3 obtains a light intensity distribution indicating a degree of lens blur and its peak coordinates not for the specific image at each of the four corners of the superimposition display region but for the specific image only at the center in the vertical direction of the superimposition display region or at each of the upper and lower corners thereof. With this configuration, the information processing apparatus 3 can efficiently obtain coordinate values that serve as a base for alignment for each appropriate region of the projection image.

From the captured image of the test pattern 90, the information processing apparatus 3 (second computation section 32) according to the embodiment calculates, for the sub test pattern STP as the specific image in the test pattern 90, PSF data for the referencing projector 1B that is centered on the peak coordinates on the base projector 1A side.

That is, as with the base projector 1A side, the information processing apparatus 3 also obtains, for the referencing projector 1B side, a light intensity distribution for the same sub test pattern STP in the test pattern 90 in a unit of a pixel of the projection image. The light intensity distribution is centered on the peak coordinates on the base projector 1A side.

Accordingly, with the coordinate values on the camera scale that serve as a base for alignment, information regarding the lens blur of the referencing projector 1B can be obtained as the intensity distribution of a dot on the referencing projector 1B side. Moreover, with the coordinate values on the camera scale, the projection positional deviation of the referencing projector 1B side from the base projector 1A can be obtained in a unit of a subpixel.

It is noted that although the positional deviation has been described as the deviation of the coordinates of the peak value, a representative value of a plurality of amounts of coordinate deviation may be used. That is, in a case where PSF data and peak coordinates on the base projector 1A side and PSF data centered on the peak coordinates of the base projector 1A on the referencing projector 1B side are obtained for each of a plurality of dots in one sub test pattern STP, a plurality of values can be obtained as the amount of deviation. Conceivably, therefore, the average value, the center of gravity value, the maximum value, the minimum value, or the like is used as the representative value, and the positional deviation is corrected accordingly.

In the example described in the embodiment, the information processing apparatus 3 (the first computation section 31 and the second computation section 32) performs PSF data calculation processing by acquiring captured images of the test patterns 90AH and 90BH that have been geometrically corrected on the basis of the alignment of the projection positions performed in advance between the plurality of projectors 1 and that have been projected by the respective projectors 1 and captured by the imaging apparatus 2.

By performing the calculation using the images of the test patterns geometrically corrected from the alignment between the projectors 1, the positional deviation obtained from the information obtained by the first computation section 31 and the second computation section 32 is the remaining amount of positional deviation. Accordingly, the positional deviation can be corrected more finely.

That is, in a case where there is a remaining positional deviation after the alignment of overlapping regions between the plurality of projectors 1, information for simultaneously correcting the positional deviation and the lens blur of each projector 1 can be obtained.

It is noted that, in some cases, as the alignment, the projection image of the referencing projector 1B is aligned to the projection image of the base projector 1A serving as a base and the geometric correction is performed only on the referencing projector 1B side. In any case, at least the second computation section 32 performs the PSF data calculation processing by acquiring a captured image of the geometrically corrected test pattern 90BH projected by the referencing projector 1B and captured by the imaging apparatus 2.

In the example described in the embodiment, the information processing apparatus 3 includes the inverse filter computation section 33. The inverse filter computation section 33 generates inverse filters using information regarding PSF data and its peak coordinates calculated by the first computation section 31 and PSF data calculated by the second computation section 32. The inverse filters are applied to the image signal processing of the respective projectors 1.

Since the information processing apparatus 3 includes the inverse filter computation section 33 to generate inverse filters and supply the inverse filters to the respective projectors 1, the correction processing can be performed on image signals. This leads to a reduction in the load on the projectors 1 side and enables precise alignment and lens blur correction.

The information processing apparatus 3 (inverse filter computation section 33) generates an inverse filter to be used in the base projector 1A using PSF data (information regarding a light intensity distribution indicating a degree of lens blur) calculated by the first computation section 31.

Since the base projector 1A serves as a positional base, the base projector 1A is only required to perform lens blur correction. Therefore, an inverse filter is generated using the PSF data calculated by the first computation section 31. Accordingly, the inverse filter that corrects the lens blur of the base projector 1A can be generated.

The information processing apparatus 3 (inverse filter computation section 33) generates an inverse filter to be used in the referencing projector 1B using the peak coordinates calculated by the first computation section 31 and PSF data (information regarding a light intensity distribution indicating a degree of lens blur) calculated by the second computation section 32.

The referencing projector 1B is only required to perform the lens blur correction together with the positional correction using the base projector 1A as a base. Then, by using the peak coordinates calculated by the first computation section 31, the amount of positional deviation can be detected as a deviation of the PSF peak coordinates obtained by the second computation section 32. Moreover, a degree of lens blur can be identified from the PSF data calculated by the second computation section 32. Accordingly, an inverse filter that corrects the lens blur and positional deviation of the referencing projector 1B can be generated.

As described above, the information processing apparatus 3 according to the embodiment can output, as the interface section 35, information regarding PSF data and its peak coordinates calculated by the first computation section 31 and PSF data calculated by the second computation section 32 to external equipment.

With this configuration, an apparatus other than the information processing apparatus 1, for example, each projector 1 side, another information processing apparatus, or the like, can generate inverse filters and cause the respective projectors 1 to perform the correction processing on image signals using the respective inverse filters. This is useful in a case where there is a desire to reduce the processing load of the information processing apparatus 2.

The program according to the embodiment causes the CPU 151 of the computer apparatus with the configuration as illustrated in FIG. 4 to perform the first computation processing (S201 to S208) that calculates PSF data (a light intensity distribution indicating a degree of lens blur) and its peak coordinates for the base projector 1A using a captured image obtained by capturing the test pattern 90 projected by the base projector 1A in the arrangement state in which the plurality of projectors 1 is arranged such that a part of or an entire projection image projected by each of the plurality of projectors 1 is displayed in a superimposed manner. Further, the program according to the embodiment causes the CPU 151 of the computer apparatus to perform second computation processing (S211 to S219) that calculates, using a captured image obtained by capturing the test pattern 90 projected by the referencing projector 1B, PSF data (a light intensity distribution indicating a degree of lens blur) for the referencing projector 1B that is centered on the peak coordinates obtained for the base projector 1A in the above-described arrangement state.

That is, this is a program that causes the CPU 151 to perform the processing of FIG. 12.

Such a program facilitates implementation of the information processing apparatus 3 according to the present embodiment.

In addition, such a program can be stored in advance in a recording medium incorporated in equipment such as a computer apparatus, a ROM in a microcomputer including a CPU, or the like. Alternatively, such a program can be accommodated (stored) temporarily or permanently in a removable recording medium such as a semiconductor memory, a memory card, an optical disc, a magneto-optical disc, or a magnetic disk. Further, such a removable recording medium can be provided as what is called package software.

Further, such a program can not only be installed from a removable recording medium to a personal computer or the like, but also be downloaded from a download site via a network such as a LAN or the Internet.

It is noted that the effects described in the present specification are merely examples and are not limited. Further, there may be additional effects.

It is noted that the present technology can also have the following configurations.

(1)

An information processing apparatus including: a first computation section configured to calculate a light intensity distribution indicating a degree of lens blur of a base projector and peak coordinates of the light intensity distribution using a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors; and a second computation section configured to calculate a light intensity distribution centered on the peak coordinates and corresponding to a degree of lens blur of a referencing projector using a captured image obtained by capturing the test pattern projected by the referencing projector, the referencing projector being included in the plurality of projectors other than the base projector, in the arrangement state.

(2)

The information processing apparatus according to (1), in which from the captured image of the test pattern, the first computation section obtains, using a specific image in the test pattern, the light intensity distribution corresponding to the degree of lens blur of the base projector in a unit of a pixel of the projection image and the peak coordinates of the light intensity distribution.

(3)

The information processing apparatus according to (2), in which the specific image is set at each of a plurality of locations in the projection image.

(4)

The information processing apparatus according to (2) or (3), in which the specific image includes an image including a one-pixel dot image.

(5)

The information processing apparatus according to any one of (2) to (4), in which the specific image is set at least at a center and each of four corners of a superimposition region in the projection image.

(6)

The information processing apparatus according to any one of (2) to (4), in which the specific image is set only at a center or only at each of upper and lower corners of a superimposition region in the projection image.

(7)

The information processing apparatus according to any one of (2) to (6), in which from the captured image of the test pattern, the second computation section calculates, for the specific image in the test pattern, the light intensity distribution centered on the peak coordinates and corresponding to the degree of lens blur of the referencing projector.

(8)

The information processing apparatus according to any one of (1) to (6), in which the second computation section performs calculation processing by acquiring the captured image of the test pattern that has been geometrically corrected on the basis of alignment of projection positions performed in advance among the plurality of projectors and that has been projected by each projector and captured by an imaging apparatus.

(9)

The information processing apparatus according to (1) to (8), further including:

an inverse filter computation section configured to generate inverse filters using information regarding the light intensity distribution indicating the degree of lens blur and the peak coordinates of the light intensity distribution calculated by the first computation section and information regarding the light intensity distribution corresponding to the degree of lens blur calculated by the second computation section, the inverse filters being applied to image signal processing of the respective projectors.

(10)

The information processing apparatus according to (9), in which the inverse filter computation section generates an inverse filter to be used in the base projector using the information regarding the light intensity distribution indicating the degree of lens blur calculated by the first computation section.

(11)

The information processing apparatus according to (9) or (10), in which the inverse filter computation section generates an inverse filter to be used in the referencing projector using the information regarding the peak coordinates calculated by the first computation section and the light intensity distribution indicating the degree of lens blur calculated by the second computation section.

(12)

The information processing apparatus according to (1) to (8), further including:

an output section configured to output, to external equipment, information regarding the light intensity distribution indicating the degree of lens blur and the peak coordinates of the light intensity distribution calculated by the first computation section and information regarding the light intensity distribution corresponding to the degree of lens blur calculated by the second computation section.

(13)

A computation method of an information processing apparatus, the computation method including:

a first computation step of calculating a light intensity distribution indicating a degree of lens blur of a base projector and peak coordinates of the light intensity distribution using a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors; and a second computation step of calculating a light intensity distribution centered on the peak coordinates and corresponding to a degree of lens blur of a referencing projector using a captured image obtained by capturing the test pattern projected by the referencing projector, the referencing projector being included in the plurality of projectors other than the base projector, in the arrangement state.

(14)

A program causing an information processing apparatus to perform:

first computation processing of calculating a light intensity distribution indicating a degree of lens blur of a base projector and peak coordinates of the light intensity distribution using a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors; and second computation processing of calculating a light intensity distribution centered on the peak coordinates and corresponding to a degree of lens blur of a referencing projector using a captured image obtained by capturing the test pattern projected by the referencing projector, the referencing projector being included in the plurality of projectors other than the base projector, in the arrangement state.

REFERENCE SIGNS LIST

1 . . . Projector, 1A . . . Base projector, 1B . . . Referencing projector, 2 . . . Imaging apparatus, 3 . . . Information processing apparatus, 10 . . . Projection optical system, 11 . . . Image signal processing section, 30 . . . Image acquisition section, 31 . . . First computation section, 32 . . . Second computation section, 33 . . . Inverse filter operation section, 34 . . . Storage section, 35 . . . Interface section, 90 . . . Test pattern, 100 . . . Screen, STP . . . Sub test pattern

The invention claimed is:

1. An information processing apparatus comprising:
a first computation section configured to calculate a light intensity distribution indicating a degree of lens blur of a base projector and peak coordinates of the light intensity distribution based on a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors; and
a second computation section configured to calculate a light intensity distribution centered on the peak coordinates of the light intensity distribution calculated based on the captured image obtained by capturing the test pattern projected by the base projector and corresponding to a degree of lens blur of a referencing projector based on a captured image obtained by capturing the test pattern projected by the referencing projector, the referencing projector being included in the plurality of projectors other than the base projector, in the arrangement state,
wherein the first computation section and the second computation section are each implemented via at least one processor.

2. The information processing apparatus according to claim 1, wherein
from the captured image of the test pattern, the first computation section is further configured to obtain, based on a specific image in the test pattern, the light intensity distribution corresponding to the degree of lens blur of the base projector in a unit of a pixel of the projection image and the peak coordinates of the light intensity distribution.

3. The information processing apparatus according to claim 2, wherein
the specific image is set at each of a plurality of locations in the projection image.

4. The information processing apparatus according to claim 2, wherein
the specific image includes an image including a one-pixel dot image.

5. The information processing apparatus according to claim 2, wherein
the specific image is set at least at a center and each of four corners of a superimposition region in the projection image.

6. The information processing apparatus according to claim 2, wherein
the specific image is set only at a center or only at each of upper and lower corners of a superimposition region in the projection image.

7. The information processing apparatus according to claim 2, wherein
from the captured image of the test pattern, the second computation section is further configured to calculate, for the specific image in the test pattern, the light intensity distribution centered on the peak coordinates and corresponding to the degree of lens blur of the referencing projector.

8. The information processing apparatus according to claim 1, wherein
the second computation section is further configured to perform calculation processing by acquiring the captured image of the test pattern that has been geometrically corrected on a basis of alignment of projection positions performed in advance among the plurality of projectors and that has been projected by each projector and captured by an imaging apparatus.

9. The information processing apparatus according to claim 1, further comprising:
an inverse filter computation section configured to generate inverse filters based on information regarding the light intensity distribution indicating the degree of lens blur and the peak coordinates of the light intensity distribution calculated by the first computation section and information regarding the light intensity distribution corresponding to the degree of lens blur calculated by the second computation section, the inverse filters being applied to image signal processing of a respective projector of the plurality of projectors, wherein the inverse filter computation section is implemented via at least one processor.

10. The information processing apparatus according to claim 9, wherein
the inverse filter computation section is further configured to generate an inverse filter to be used in the base projector based on the information regarding the light intensity distribution indicating the degree of lens blur calculated by the first computation section.

11. The information processing apparatus according to claim 9, wherein
the inverse filter computation section is further configured to generate an inverse filter to be used in the referencing projector based on the information regarding the peak coordinates calculated by the first computation section and the light intensity distribution indicating the degree of lens blur calculated by the second computation section.

12. The information processing apparatus according to claim 1, further comprising:
an output section configured to output, to external equipment, information regarding the light intensity distribution indicating the degree of lens blur and the peak coordinates of the light intensity distribution calculated by the first computation section and information regarding the light intensity distribution corresponding to the degree of lens blur calculated by the second computation section,
wherein the output section is implemented via at least one processor.

13. A computation method of an information processing apparatus, the computation method comprising:
calculating a light intensity distribution indicating a degree of lens blur of a base projector and peak coordinates of the light intensity distribution based on a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors; and
calculating a light intensity distribution centered on the peak coordinates of the light intensity distribution calculated based on the captured image obtained by capturing the test pattern projected by the base projector and corresponding to a degree of lens blur of a referencing projector based on a captured image obtained by capturing the test pattern projected by the referencing projector, the referencing projector being included in the plurality of projectors other than the base projector, in the arrangement state.

14. The information processing apparatus according to claim 1, wherein
from the captured image of the test pattern, the first computation section is further configured to obtain, using a specific image in the test pattern, the peak coordinates of the light intensity distribution.

15. A non-transitory computer-readable medium having embodied thereon a program, which when executed by a computer causes the computer to execute a computation method, the method comprising:
calculating a light intensity distribution indicating a degree of lens blur of a base projector and peak coordinates of the light intensity distribution based on a captured image obtained by capturing a test pattern projected by the base projector in an arrangement state in which a plurality of projectors is arranged such that a part of or an entire projection image projected by each of the plurality of projectors is displayed in a superimposed manner, the base projector being one of the plurality of projectors; and
calculating a light intensity distribution centered on the peak coordinates of the light intensity distribution calculated based on the captured image obtained by capturing the test pattern projected by the base projector and corresponding to a degree of lens blur of a referencing projector based on a captured image obtained by capturing the test pattern projected by the referencing projector, the referencing projector being included in the plurality of projectors other than the base projector, in the arrangement state.

* * * * *